(12) United States Patent
Yavuz et al.

(10) Patent No.: US 12,250,115 B2
(45) Date of Patent: Mar. 11, 2025

(54) METHOD AND APPARATUS FOR MICROSLICING WIRELESS ENTERPRISE COMMUNICATION NETWORKS USING MICROSLICE PROFILES

(71) Applicant: Celona, Inc., Cupertino, CA (US)

(72) Inventors: Mehmet Yavuz, Palo Alto, CA (US); Srinivasan Balasubramanian, San Diego, CA (US); Rajeev Shah, Los Gatos, CA (US); Vinay Anneboina, San Jose, CA (US); Andrew Von Nagy, Cupertino, CA (US); Keshav Sai Srinivas Nanduri, Cupertino, CA (US)

(73) Assignee: Celona, Inc., Cambell, CA (US)

( * ) Notice: Subject to any disclaimer, the term of this patent is extended or adjusted under 35 U.S.C. 154(b) by 467 days.

(21) Appl. No.: 17/687,546

(22) Filed: Mar. 4, 2022

(65) Prior Publication Data

US 2022/0255798 A1 Aug. 11, 2022

Related U.S. Application Data

(63) Continuation-in-part of application No. 16/790,645, filed on Feb. 13, 2020, now Pat. No. 11,284,288.

(Continued)

(51) Int. Cl.
*H04L 41/0806* (2022.01)
*H04L 41/0816* (2022.01)
(Continued)

(52) U.S. Cl.
CPC ...... *H04L 41/0806* (2013.01); *H04L 41/0816* (2013.01); *H04L 41/0893* (2013.01); *H04L 41/0895* (2022.05); *H04L 41/5006* (2013.01)

(58) Field of Classification Search
CPC ............. H04L 41/0806; H04L 41/0816; H04L 41/0893; H04L 41/0895; H04L 41/5006;
(Continued)

(56) References Cited

U.S. PATENT DOCUMENTS

| 8,842,578 B1 * | 9/2014 | Zisapel ................... H04L 43/20 370/255 |
| 11,284,288 B2 | 3/2022 | Yavuz et al. |

(Continued)

FOREIGN PATENT DOCUMENTS

| WO | 2019185130 | 10/2019 | |
| WO | WO-2020069758 A1 * | 4/2020 | ......... H04L 41/0823 |

OTHER PUBLICATIONS

Thomas, Shane, International Search Report and Written Opinion received from the USRO dated May 28, 2021 for appln. No. PCT/US2020/065043, 23 pgs.

(Continued)

*Primary Examiner* — Ricardo H Castaneyra
(74) *Attorney, Agent, or Firm* — Jaquez Land Greenhaus & McFarland, LLP; Bruce W. Greenhaus

(57) ABSTRACT

A method and apparatus for defining, configuring, operating, monitoring, and modifying microslices in an enterprise network is described. Microslices provide an end-to-end logical network through multiple networks, which allows efficient arrangement of data flows in the enterprise network with a defined Quality of Service (QoS). Various embodiments of a system for creating and implementing microslice instances in a wireless communications network are disclosed. A microslice instance can connect a UE in the enterprise network with an external server. In some embodiments, the enterprise network administrator can define Service Level Objectives (SLOs), device groups, service types, and user application groups, and associate them with one or more microslices. An orchestrator can configure the (Continued)

microslice with an appropriate amount of network resources to be allocated to the microslice, and then set-up, operate, monitor, and modify the microslice instance to adapt to current network conditions.

20 Claims, 21 Drawing Sheets

Related U.S. Application Data

(60) Provisional application No. 62/956,066, filed on Dec. 31, 2019, provisional application No. 63/280,060, filed on Nov. 16, 2021, provisional application No. 63/283,211, filed on Nov. 24, 2021.

(51) Int. Cl.
*H04L 41/0893* (2022.01)
*H04L 41/0895* (2022.01)
*H04L 41/5006* (2022.01)

(58) Field of Classification Search
CPC . H04L 41/15; H04L 41/5022; H04L 41/5019; H04L 41/5009; H04L 41/40; H04L 43/0829; H04L 43/0852; H04L 43/087; H04L 43/0888; H04L 43/20
See application file for complete search history.

(56) References Cited

U.S. PATENT DOCUMENTS

| | | |
|---|---|---|
| 2007/0011262 A1 | 1/2007 | Kitani |
| 2016/0212017 A1 | 7/2016 | Li |
| 2017/0141973 A1* | 5/2017 | Vrzic ................. H04L 47/2408 |
| 2017/0367036 A1 | 12/2017 | Chen |
| 2018/0132138 A1* | 5/2018 | Senarath ............ H04L 41/0813 |
| 2018/0152958 A1 | 5/2018 | Arnold |
| 2018/0270743 A1 | 9/2018 | Callard |
| 2019/0068402 A1 | 2/2019 | Mazarick |
| 2019/0124704 A1 | 4/2019 | Sun |
| 2019/0273635 A1 | 9/2019 | McNamee et al. |
| 2020/0136920 A1 | 4/2020 | Doshi |
| 2020/0178158 A1 | 6/2020 | Won |
| 2021/0084523 A1 | 3/2021 | Kucera |
| 2021/0204164 A1 | 7/2021 | Yavuz et al. |

OTHER PUBLICATIONS

GSMA, "Network Slicing Use Case Requirements", Apr. 2018, 54 pgs.
GSMA, "Network Slicing Use Cases Requirements", Dec. 14, 2019.
GSMA, "Road to 5G: Introduction and Migration", Apr. 2018, 54 pgs.
3GPP TS SD.501 V17.3.0, "3rd Generation Partnership Project; Technical Specification Group Services and System Aspects; System architecture for the 5G System (5GS); Stage 2", Release 17, Dec. 2021.

* cited by examiner

400

| Example Microslice Profile | | |
|---|---|---|
| Field Name | Value Example | Field Description |
| Microslice name/ Servoce type | Streaming | A descriptive name to identify the purpose of this microslice |
| Application definitions | Specify a list | List of applications that will be mapped to this microslice |
| Min. guaranteed throughput | 100Mbps | Minimum throughput guaranteed for each device |
| Max allowed throughput | 200Mbps | Maximum throughput cap on the device |
| MPDB (Maximum Packet Delay Budget) | 20ms | Maximum latency for any packet flowing through this slice |
| MPLR (Maximum Packet Loss Rate) | $10^{\wedge}\text{-}e3$ | Maximum packet loss rate for any flow through this slice |
| Priority | 1 | This will dictate preemption in case of congestion in the RAN. Values 1-15 are allowed. Lower number indicates critical priority. |

FIG. 4

| Example Application Definitions | | |
|---|---|---|
| Permit All | | |
| Application1 | Dest IP | 1.1.1.1 |
| | Dest Port | 123 |
| | Src Port | 6500 |
| | Protocol type | TCP |
| | DSCP | TOS field 0xb8 |
| Application 2 | Dest IP | 2.2.2.2 |
| | Dest port | 456 |
| | Protocol Type | UDP |

*FIG. 5*

| Example Device Group Definition |||
|---|---|---|
| Field Name | Value Example | Field Description |
| Device group name | Security | All the handhelds and smartphones assigned to the security organization |
| Admin | Joe | Administrator for this device group |
| Trusted | YES/NO | Trust device request for microslice access |
| VLAN or VxLAN ID | 333 | Broadcast domain for devices in this device group |
| DHCP | x.x.x.x/y | DHCP server address for this device group |

*FIG. 7*

| Example Microslice Assignment to Device Groups |||||
|---|---|---|---|---|
| Microslice Name | Streaming | IP Camera | Video Conf | Default (Internet) |
| Device Group 1 | X |  | X | X |
| Device Group 2 |  | X |  | X |
| Default Group |  |  |  | X |

Service Type Examples

IP Camera and Computer Vision (CV) ( e.g. facial recognition)
Push to Talk (PTT)
Voice over IP (VoIP)
VT (video telephone)
Teleconferencing (e.g., zoom, Skype for business)
Augmented Reality (AR)
Virtual Reality (VR)
Remote control
Robotics and automation
Multimedia streaming
Internet of Things (IoT)
Industrail IoT (IIoT)
Sensor data analytics
Best Effort traffic (ftp, web browsing etc.)
Internet download
Music
Streaming services

*FIG. 11*

METHOD AND APPARATUS FOR MICROSLICING WIRELESS ENTERPRISE COMMUNICATION NETWORKS USING MICROSLICE PROFILES

CROSS-REFERENCE TO RELATED APPLICATIONS—CLAIM OF PRIORITY

This application is a continuation-in-part of and claims priority to commonly owned and co-pending U.S. patent application Ser. No. 16/790,645, filed Feb. 13, 2020, entitled "Method and Apparatus for Microslicing Wireless Communication Networks with Device Groups, Service Level Objectives, and Load/Admission Control", to issue on Mar. 22, 2022 as U.S. Pat. No. 11,284,288, which application claims priority to U.S. Provisional Application No. 62/956,066, filed Dec. 31, 2019, entitled "Method and Apparatus for Microslicing Wireless Communication Networks with Device Groups, Service Level Objectives, and Load/Admission Control". This application also claims priority to U.S. Provisional Application No. 63/280,060, filed Nov. 16, 2021, entitled "Method and Apparatus for Microslicing Wireless Communication Networks with Device Groups, Service Level Objectives, and Load/Admission Control" and U.S. Provisional Application No. 63/283,211, filed Nov. 24, 2021, entitled "Method and Apparatus for Microslicing Wireless Enterprise Communication Networks", and the contents of all of the above-cited earlier-filed applications (application Ser. No. 16/790,645, App. No. 62/956,066, App. No. 63/280,060 and App. No. 63/283,211) are hereby incorporated by reference herein as if set forth in full.

BACKGROUND

Technical Field

The disclosed method and apparatus relate generally to wireless communications networks and more particularly to methods and apparatus for slicing the network to allow network administrators and businesses and other enterprises to more closely tailor network access with communication needs, and provide a way to more efficiently use network resources.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, and 5G NR (New Radio) is now being deployed. In these wireless systems, multiple mobile devices are served voice services, data services, and many other services over wireless connections so they may remain mobile while still connected.

FIG. 1 is an illustration of a basic configuration for a communication network, such as a "4G LTE" (fourth generation Long-Term Evolution) or "5G NR" (fifth generation New Radio) network. Through this network configuration, user equipment (UE) 101a and 101b can connect to External Packet Data Networks (PDNs) 103 and access any of a variety of services such as the Internet, Application Servers, Data Services, Voice Services, and others.

The UEs 101a and 101b connect wirelessly over respective communication links 105a and 105b to a Radio Access Network (RAN) 107 that includes a base station/access point (BS/AP) 109. One of the advantages of such networks is their ability to provide communications to and from multiple wireless devices and provide these wireless devices with access to a large number of other devices and services even though the devices may be mobile and moving from location to location.

UE

As used herein, the term "UE' refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement.

BS/AP

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which e.g. may be an LTE or 5G device), a WiFi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111. One function of the Core Network 111 is to provide control of wireless signaling between the UEs 101 and the RAN 107. Another function of the Core Network 111 is to provide access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the core network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 provides control of the air interface between the BS/AP 119 and the UEs 101. The Core Network 111 may also coordinate the BS/APs 109 to minimize interference within the network.

Network Slicing

In mobile communication networks such as 4G LTE (LTE) and 5G NR (5G) networks, it is desirable to tailor connectivity and data processing to specific requirements of various applications run by the mobile devices. By tailoring connectivity and data processing to specific requirements, a greater efficiency and productivity of business communication processes can be achieved and furthermore, opportunities open up for service providers to address different business segments and enterprises more effectively. For this purpose, network slicing was introduced for LTE/5G networks. In 5G, network slicing is a network architecture that enables the multiplexing of virtualized and independent logical networks on the same physical network infrastructure. Each network slice is an isolated end-to-end network tailored to fulfil diverse requirements requested by a particular application.

The GSM Association (GSMA) is a telecommunications industry group involved in 5G. A publication entitled "Network Slicing Use Case Requirements", dated Apr. 18, 2018, discusses network slicing. From a mobile operator's point of view, a network slice is an independent end-to-end logical network that runs on a shared physical infrastructure, capable of providing an agreed service quality. The technology that enables network slicing is transparent to business customers for whom LTE/5G networks, and in combination with network slicing, allows connectivity and data processing tailored to specific business requirements. The customizable network capabilities include data speed, quality, latency, reliability, security, and services. These capabilities may be provided based on a Service Level Agreement (SLA) between the mobile operator and the business customer.

A network slice may span across multiple parts of the network (e.g., access network, core network and transport network) and could be deployed across multiple operators. A network slice may utilize dedicated and/or shared resources, (e.g., in terms of processing power, storage, and bandwidth), and each network slice is effectively isolated from the other network slices.

It is anticipated that mobile network operators could deploy a single network slice type that satisfies the needs of multiple verticals, as well as multiple network slices of different types that are packaged as a single product targeted towards business customers (a business bundle) who have multiple and diverse requirements. For example, a vehicle may need simultaneously a high bandwidth slice for infotainment and an ultra-reliable slice for telemetry-assisted driving.

In summary, a network slice is a logical network that provides specific network capabilities and network characteristics in order to serve a defined business purpose of a customer. Network slicing allows multiple virtual networks to be created on top of a common shared physical infrastructure. A network slice consists of different subnets, example: Radio Access Network (RAN) subnet, Core Network (CN) subnet, Transport network subnet.

A Network Slicing Provider is typically a telecommunication service provider who is the owner or tenant of the network infrastructures from which network slices are created. The Network Slicing provider takes the responsibilities of managing and orchestrating corresponding resources that the Network Slicing consists of. A Business Customer tenants the network slice, e.g., customers from vertical industries. For instance, business customers could be enterprise or specialized industry customers (often referred to as "verticals").

Various technologies and innovations from different technical domains have substantially contributed to the Network Slicing progress in different Standards Developing Organizations (SDO). Currently, technical specifications for those different technical domains are defined in corresponding SDOs. For example, Radio Access Network (RAN) and Core Network (CN) are defined by 3GPP, Transport Network (TN) is defined by BBF, IETF, and others. ITUT (GSTR TN5G), IEEE (NGFI 1914), MEF and other SDOs are working on this topic as well.

For example, the 3GPP ($3^{rd}$ Generation Partnership Project) TS 23.501 Release 16, v16.2.0 (2019 September) specification includes particular aspects of network slicing. Details are specified in 3GPP 23.501 section 5.15. The UE device may provide Network Slice Selection Assistance Information (NSSAI) parameters to the network to help the network select a RAN and a Core Network part of a Network Slice Instance (NSI) for the device. A single NSSAI may lead to the selection of several slices. The network may also use device capabilities, subscription information and local operator policies to do the selection.

Network slices may differ for supported features and network functions optimizations, in which case such Network Slices may have e.g., different S-NSSAIs with different Slice/Service Types (SSTs) (see 3GPP TS 23.501 section 5.15.2.1). The operator can deploy multiple network slices delivering exactly the same features but for different groups of UEs, e.g., as they deliver a different committed service and/or because they are dedicated to a customer, in which case such Network Slices may have e.g., different S-NSSAIs with the same Slice/Service Type but different Slice Differentiators (see TS 23.501 section 5.15.2.1).

The network may serve a single UE with one or more Network Slice instances simultaneously via a 5G Access Network (5G-AN) regardless of the access type(s) over which the UE is registered (e.g., 3GPP Access and/or Non-3Gpp (N3GPP Access). The Access and Mobility management Function (AMF) instance serving the UE logically belongs to each of the network slice instances serving the UE, i.e., this AMF instance is common to the Network Slice instances serving a UE.

Although the standard discusses a basic architecture for network slicing, it is limited and provides no particular mechanism for defining and administering network slices, and typically network slices as defined in the standards would be defined and administered by the large telecommunications companies that serve large numbers of customers, which would keep prices high, and reduce the pace of adoption by relatively smaller enterprises. Accordingly, there is presently a desire for a network slicing mechanism that is more flexible, more efficient, and more easily implemented and administered. Such a mechanism would simplify administration, allow more control, save time, allow remote administration, and make better use of limited bandwidth. It would also be an advantage to monitor the network slicing mechanism as it is operating and to modify the operations, to provide greater efficiency, and to meet network functionality, business goals, and demands.

SUMMARY

Enterprises have been moving towards digital solutions and this includes optimization of compute, storage and networking infrastructure for optimal performance of their business applications. Many enterprises prefer to use standardized LTE/5G networks because they provide a wireless network infrastructure with high reliability that meets their specific requirements, and these standards define network slices. However, each enterprise's specific needs may go beyond the standard network slices defined by the Standard Development Organizations (SDOs), which typically are defined, installed, and administered by large telecommunication companies. Enterprises need a way to flexibly create and manage network slices, and it would be advantageous if the systems can be administered by IT professionals, which would reduce costs and increase the pace of adoption of the technology. Furthermore, it would be advantageous for the microslices to provide a more efficient network.

In order to assist enterprises to more cost effectively and efficiently operate their enterprise networks, microslices are described herein. Microslices can be used for example to provide an end-to-end logical network through multiple networks and ensure that certain Quality of Service (QoS) and Service Level Objective (SLO) requirements are met for different service types or applications. From an overall viewpoint, embodiments that use microslicing as described herein take a more granular approach to network slicing for enterprise LTE/5G deployments than the standard-based network slicing approach, which allows greater customization of services, faster updates, and simplifies administration. Also, this more granular approach provides users and the enterprise with more efficient use of bandwidth and better service for the UEs.

Various embodiments of a system for creating and implementing microslices in a wireless communications network are disclosed. Multiple embodiments are disclosed, in some embodiments, the network administrator can specify one or more applications, devices, and/or users that are allowed to use one or more microslices. In some embodiments, the network administrator can define one or more groups of UEs; and associated one or more microslices to each of those groups. In some embodiments, the network administrator can also define a plurality of service types, and associate one or more microslices to those service types. In some embodiments, the network administrator can also specify an amount of network resources to be allocated to the microslice, such as a percentage.

In one embodiment a method for implementing a microslice is disclosed that provides a communication path for a wireless device connected to an enterprise network. The method includes receiving device information, microslice profiles and resource availability information from the enterprise network, responsive to the device information and microslice profiles, selecting a microslice profile, responsive to the selected microslice profile and the resource availability information, determining a network configuration that defines a microslice instance, including defining functional blocks and communication links between the functional blocks in the enterprise network, and responsive to the network configuration, setting up and managing the functional blocks and the communication links between the functional blocks, to implement the microslice instance for the wireless device. Resources may be allocated to the microslice configuration in a Network Resource Allocation Module responsive to the resource availability information provided by the enterprise network. A method includes monitoring at least one functional unit and at least one link in the microslice instance, to provide KPIs that are compared with the SLOs in the microslice profile, and if the performance requirements are not met, dynamically adapting the microslice instance responsive to the revised microslice configuration. The device may be associated with a device group, and the microslice profile may be selected and/or set-up responsive to device group associated with the device.

A microslice orchestration module is disclosed for implementing a microslice that provides a communication path for a wireless device connected to a network, including a receiving unit for receiving device information, microslice profiles and resource availability information, a microslice orchestrating unit for determining a network configuration that defines a microslice instance responsive to the device information, microslice profiles and the resource availability information, the network configuration of the microslice instance defining functional blocks and communication links between the functional blocks, and a configuration control unit for setting up and controlling the functional blocks and the communication links between the functional blocks responsive to the network configuration, to implement the microslice instance for the wireless device.

The following benefits may be provided by some of the embodiments described herein:
  breaking down the core network (EPC) into microservices assigns "dedicated" or "isolated" resources to each microslice;
  the ability to scale each microslice instance intelligently, and independently, honors the Service Level Objectives (SLOs) for that microslice;
  the capability to upgrade each microservice (microslice) independently and remotely over the air, which in some cases can be performed automatically, without input from the network administrators, provides ease of administration and reduces upgrade costs;
  the ability to dynamically move services between the customer's edge and cloud instances provides greater flexibility to serve bursty workloads quickly and efficiently;
  the ability to create logs and get necessary metrics allows real-time monitoring the performance of each microslice instance;
  the ability to operate and administer the network (RAN and Core Network) remotely allows network infrastructure to be provided as a service. Particularly, the microservices architecture provides the opportunity to spin up the resources on the cloud and on demand to technically provide all of the network infrastructure as a cloud native application;
  seamless integration with existing enterprise local area network (LAN) and enterprise backhaul wide area network (WAN);
  providing end-to-end quality of service (QoS) across networks (RAN, LAN and optionally WAN) ensures that users will be served appropriately using adequate resources; and
  providing granular access control enforcement enhances security while ensuring that user have access to what they need.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 4 is a table showing an example microslice profile.

FIG. 5 is a table showing an example of allowed application definitions for a microslice.

FIG. 7 is a table showing an example of a device group definition.

FIG. 8 is a table showing an example of microslice assignments to device groups.

FIG. 11 is a table showing an example of service types that can be associated with microslice profiles.

Figure 1:
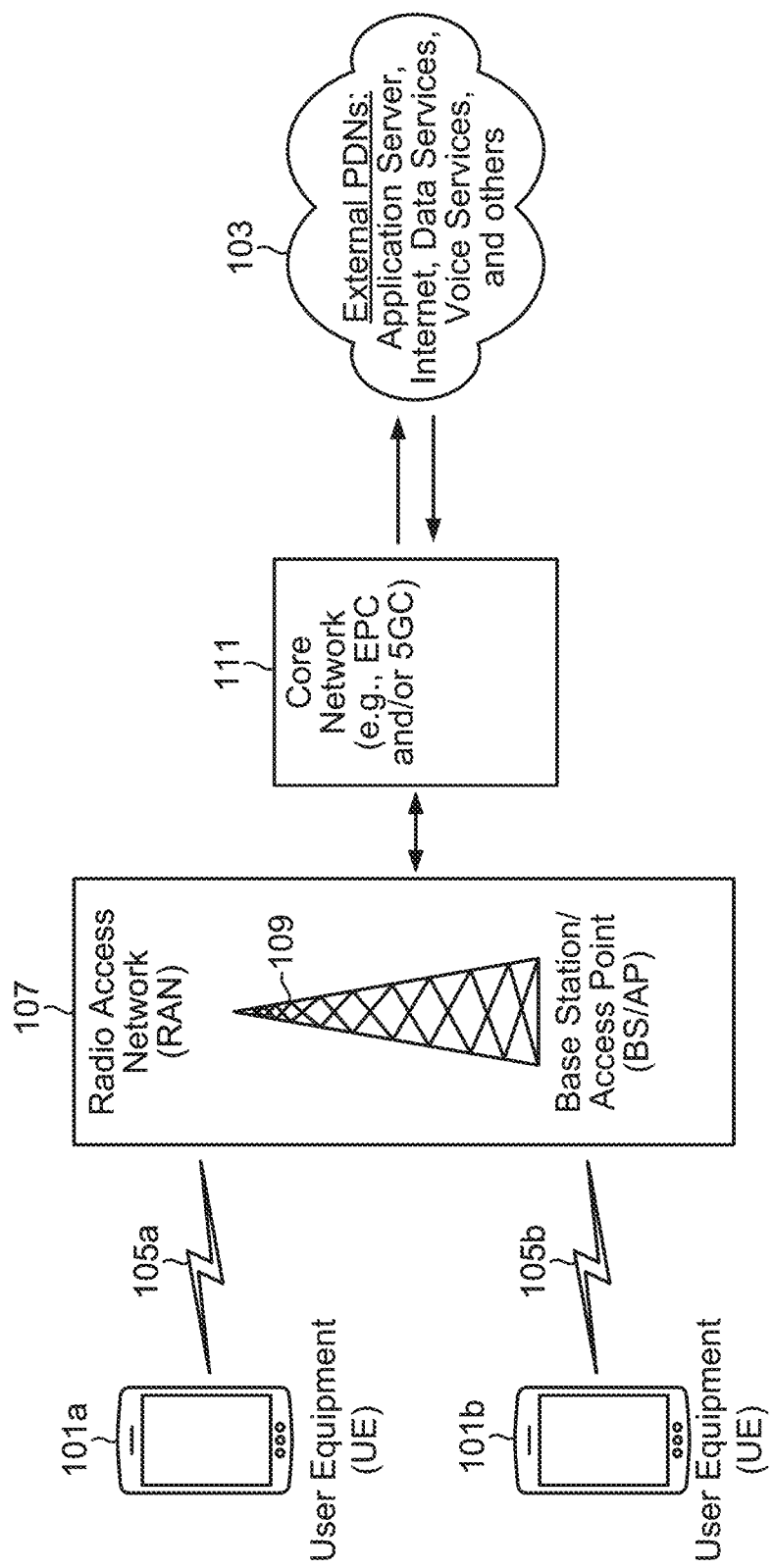
FIG. 1 is an illustration of a basic configuration for a communication network, such as a "4G LTE" (fourth generation Long-Term Evolution) or "5G NR" (fifth generation New Radio) network.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) Functional Blocks, Communication Links, and Networks

As used herein, a functional block is a computing element that performs any activity required to implement a set of logical operations. The functional block may include a dedicated processing circuit that performs an intended function, or it may be a software-implemented process across circuits that performs the intended function. The functional blocks may reside inside or outside an enterprise network, and the functional block may include a LAN, a VLAN or a VxLAN or another network or network element, and it may reside in an internal network, or an external network. In the current disclosure, the activity required to implement a set of logical operations is performed for the purpose of facilitating end-to-end communication (e.g., between a UE and an external server). In the communication context, the functional block may be in the control plane or the user plane. To monitor a functional block, control information is exchanged between the block and the orchestrator. For example, the orchestrator may make a query, and the functional block may respond.

A communication link is a connection between two functional blocks that provides communication between the two functional blocks. The communication link may include any appropriate connection type, such as wireless or wired, and utilize any suitable protocol. The link and/or protocol may be secure or otherwise. A communication link may be monitored at any point in the link, for example it may be monitored at its entry point and/or its exit point to provide performance data.

Communication networks and system components are described herein using terminology and components common to 4G (LTE) communication systems, and/or 5G NR communication systems. However, the principles of the communication network and microslices described herein more widely apply to other communication systems, not only to 4G or 5G systems.

(2) Enterprise Network Description

A microslice implementation in the context of an enterprise network is described herein. Although described in the context of an enterprise network, the principles disclosed can also apply to any private network and more generally public networks. An enterprise network is one type of private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for its own use. Other types of private networks may be operated by a private network manager for use by more than one organization.

(3) Microslice Instance and Microslice Overview

Figure 2A:
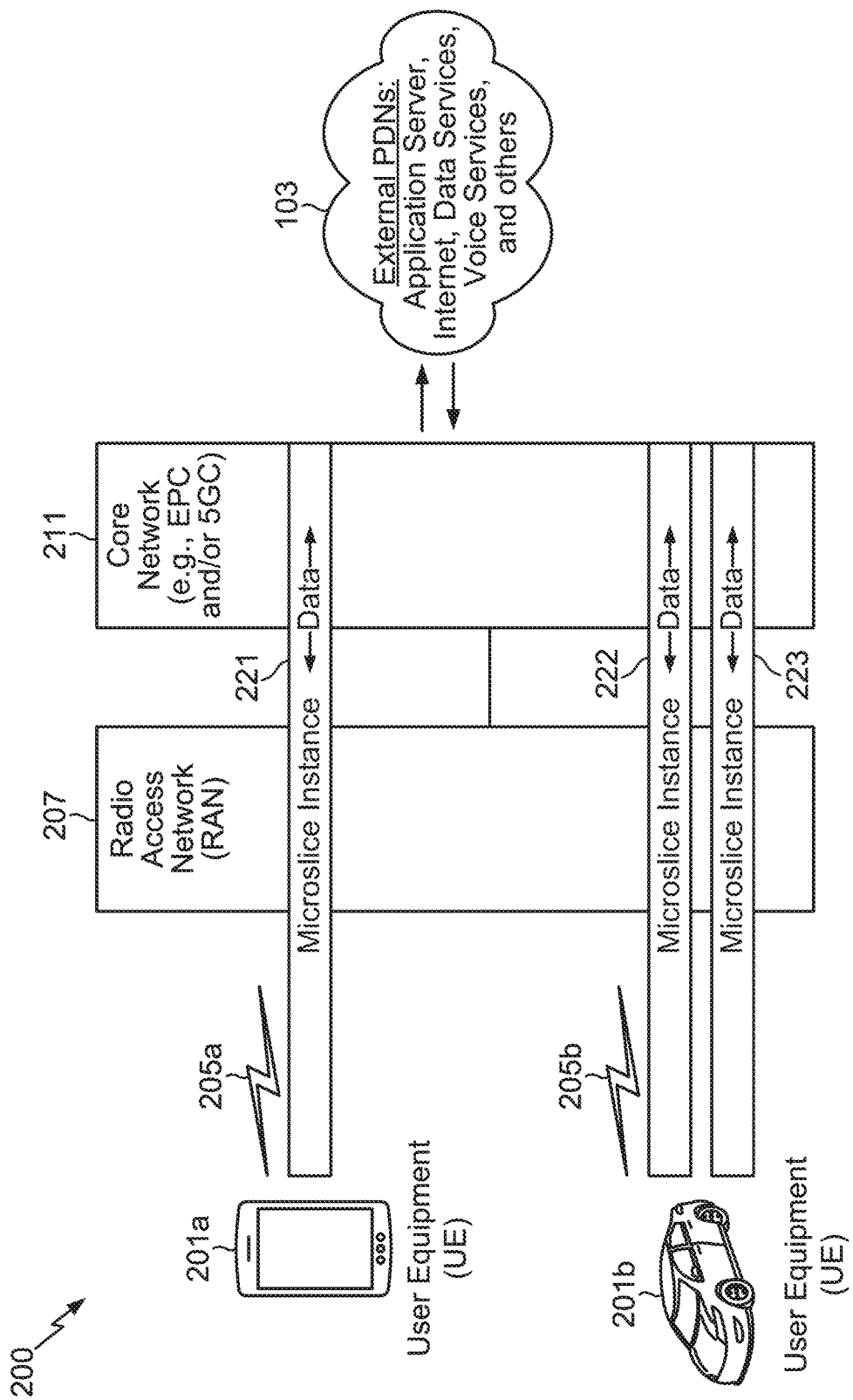
FIG. 2A is a block diagram illustrating microslice instances across multiple networks including a wireless network.

FIG. 2A is a block diagram illustrating microslice instances in a wireless network 200. In FIG. 2A, a mobile phone UE 201a is connected via a wireless link 205a to a RAN 207, which is connected to a Core Network 211. A vehicle 201b is connected via a wireless link 205b to the RAN 207. It should be apparent that the different devices, and even different functions in the UEs have different communication requirements. For example, the mobile phone UE 201a may have a need for voice communication. The vehicle 201b may need a highly reliable link for navigation, and another for data communication. To address these needs, microslices are described herein.

Generally, a microslice instance provides the path of data flows to and from a device. A device may be a UE or other device such as an Access Point (AP), a router, or other component in the communication network. Although typically the microslice's data flow will travel end-to-end (i.e., from the UE to the edge of the external PDN), the data flow may travel through all or parts of the RAN, Core Network, and service platforms.

A microslice instance is set up using a microslice profile, described herein. A microslice profile can be defined in any of a number of ways; for example, in some embodiments, a microslice profile may be defined to meet requirements of a service type, in other embodiments, a microslice may be associated with a user application, for example YouTube or Netflix, or a group of similar applications. Advantageously, microslice profiles can be defined by a network administrator operating one or more networks in an enterprise location, and the microslice profiles can then be applied to communications within the enterprise location's networks.

In the network 200 shown in FIG. 2A, each microslice is instantiated (i.e., established within a "microslice instance") in a manner that forms a complete logical network. A logical network is a virtual representation of a network that appears to the user as an entirely separate and self-contained network even though it might physically be only a portion of a larger network or a local area network. In FIG. 2A, a first microslice instance 221 is shown from the mobile phone UE 201a through the RAN 207 and to the Core Network 211. A second microslice instance 222 and a third microslice instance 223 are provided from the vehicle 201b through the RAN 207 and to the Core Network 211. An instance may also be established between other components of the communication network, such as in parts of the RAN and/or the Core Network, or between other components of the communication network. For example, an instance may be established between the UE 201a and the RAN 207, between the vehicle 201b and the RAN 207, or between the RAN 207 and the Core Network 211, or along any communication link that may be available.

Each microslice instance 221, 222, 223 is implemented using a set of functional blocks and communication links in the RAN 207, Core Network 211, or any other network or component that communicates with the enterprise network, such as other servers, WANs, LANs, and VLANs. One example of a Core Network is an Evolved Packet Core (EPC) in an LTE/5G network. The LTE/5G network may be part of an enterprise IT network, or other network.

FIG. 2A shows the microslice instances 221, 222, and 223 implemented across the UE 201a, the vehicle 201b, RAN 207, and Core Network 211. Microslices can be implemented across multiple networks, for example, as LTE/5G networks are deployed in enterprises, the newly-deployed networks need to be integrated into Local Area Networks (LANs), and Wide Area Networks (WANs), and microslices can be utilized for this purpose.

Advantageously, the microslice architecture enables customizable network capabilities and the ability to select QoS parameters for different service types. For example, each of several service types can be associated with a unique microslice profile that has a defined data throughput, quality, packet error rate (PER), packet latency, reliability, isolation and set of security services.

Figure 2B:
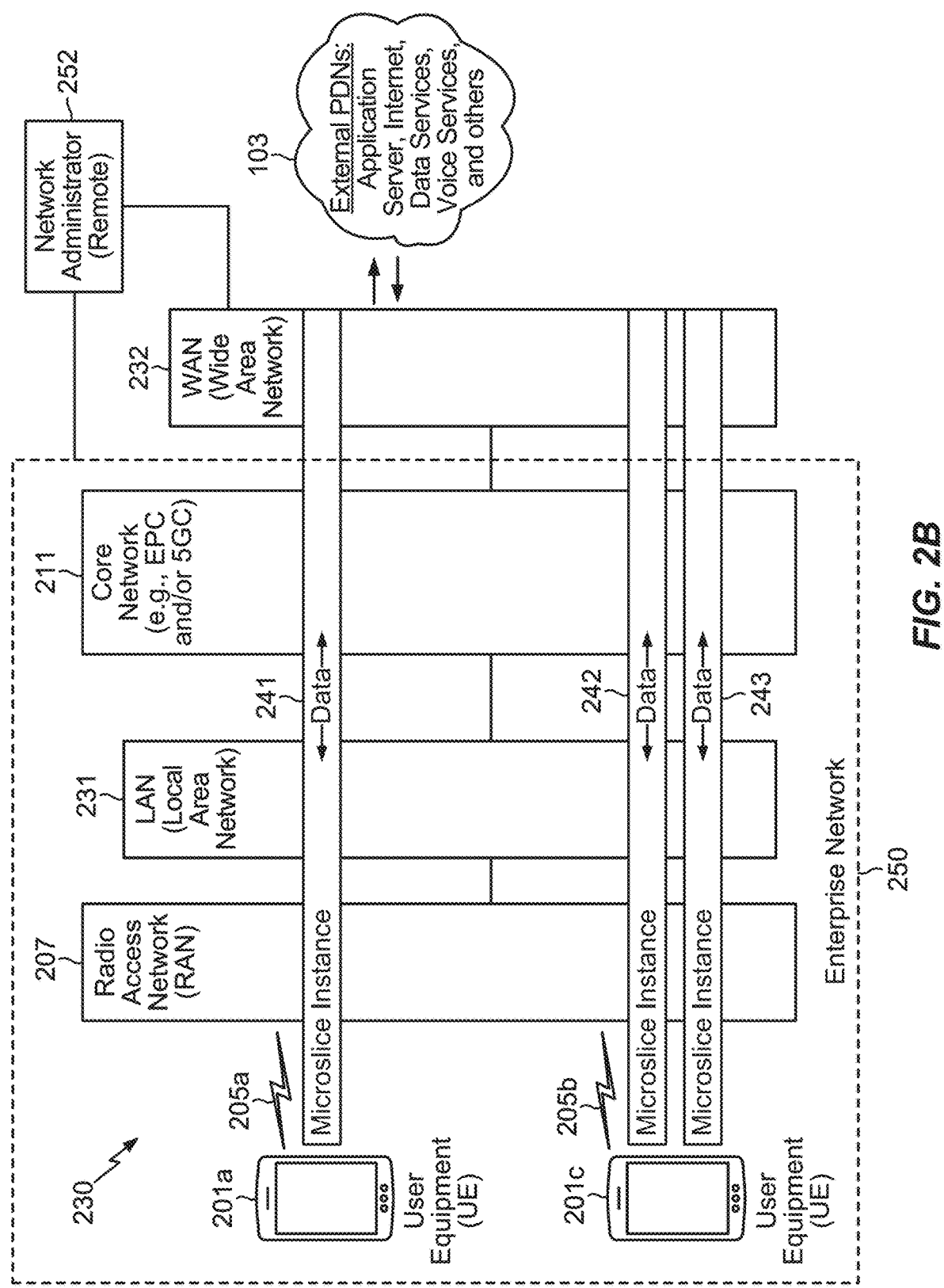
FIG. 2B is a block diagram illustrating microslice instances across multiple networks, including a wireless network, a LAN, and an external WAN.

FIG. 2B is a block diagram illustrating microslice instances across additional networks, including a Local Area LAN 231 and a WAN 232. In FIG. 2B, the plurality of UEs 201a and 201c are wirelessly connected to the RAN 207. The LAN 231 connects the RAN 207 with the Core Network 211. The WAN 232 is connected to the Core Network 211, and connects to a wide variety of external PDNs 103 and other services. These LANs and WANs may be external PDNs outside the Core Network 211, or may be internal. In many cases, firewalls (e.g., next-gen firewalls), may exist to protect the LANs and WANs. These firewalls would also be outside the Core Network 211.

In FIG. 2B, the microslice instances extend from the UE, through the networks, and into the WAN 232. Particularly a first microslice instance 241 extends from the UE (mobile phone) 201a, through the RAN 207, LAN 231, Core Network 211, and extend into the WAN 232. The QoS parameters of each the microslices can be extended to these LANs, WANs and firewalls through standard mechanisms such as QoS markings and DiffServ differentiated services code point (DSCP). Similarly, second and third microslices 242 and 243 extend from the auto UE 201b, through the RAN 207, LAN 231, Core Network 211, and extend into the WAN 232. This provides the ability to integrate a microslice with the "remaining" network components via tagging flows to enable end-to-end QoS. For example, DSCP markings for certain IP flows used by LAN switches, SDWAN routers and backhaul can be extended and combined with microslices. IP flows with specific DHCP markings can be assigned to a specific microslice.

In FIG. 2B, an enterprise network 250, shown within a block with dashed lines, includes the UEs 201, the RAN 207, LAN 231, and Core Network 211. Typically, these will be at a common location, such as a building or other defined area, however some components may be outside the defined area. A network administrator 252 may, with appropriate security, remotely administer the enterprise network 250 via the WAN and set up microslices. Alternatively, the network administrator 252 may connect directly to the enterprise network, to administer the networks and set up microslices.

For this purpose, microslice profiles can be defined using any of a number of parameters associated with the microslice, for example service type, user application, and groups of applications. These parameters may, for example be stored in a Home Subscription Server (HSS) in a 4G system (FIG. 9), or a User Data Management (UDM) in a 5G system (FIG. 10). A microslice profile may include a series of parameter levels, each level designated by an index "k"; i.e., each microslice index "k" (MSk) may be associated with a particular level of QoS parameters such as one QoS Class Indicator (QCI) value, a Guaranteed Bit Rate (GBR) value, a Maximum Bit Rate (MBR) value, and an Allocation and Retention Priority (ARP) value.

(4) Microslices and Implementation

Figure 3A:
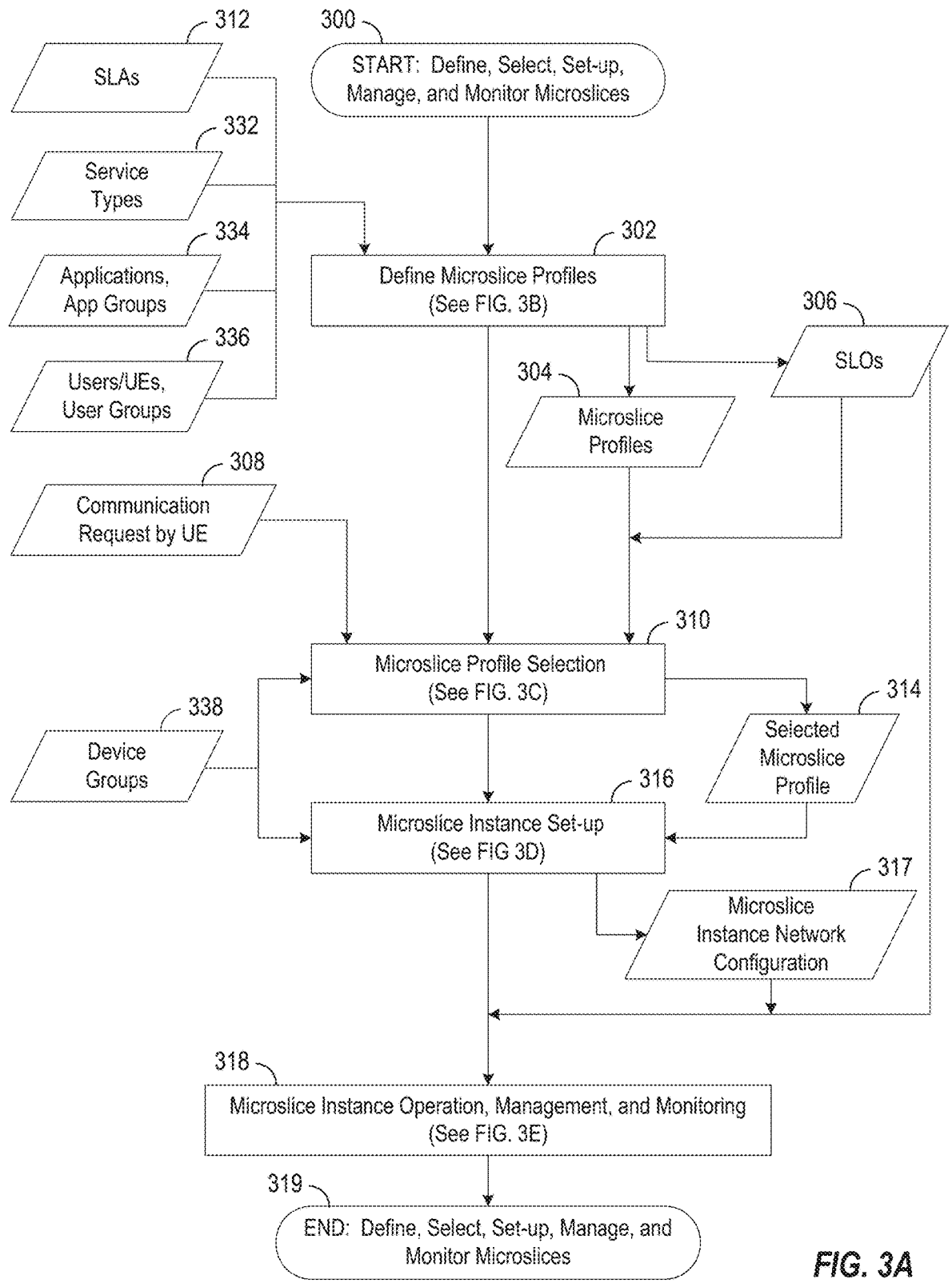
FIG. 3A is a high-level flow chart of a method for defining microslice profiles, selecting a profile for a communication, setting up the microslice instance, and managing and monitoring the microslice instance.
Figure 3B:
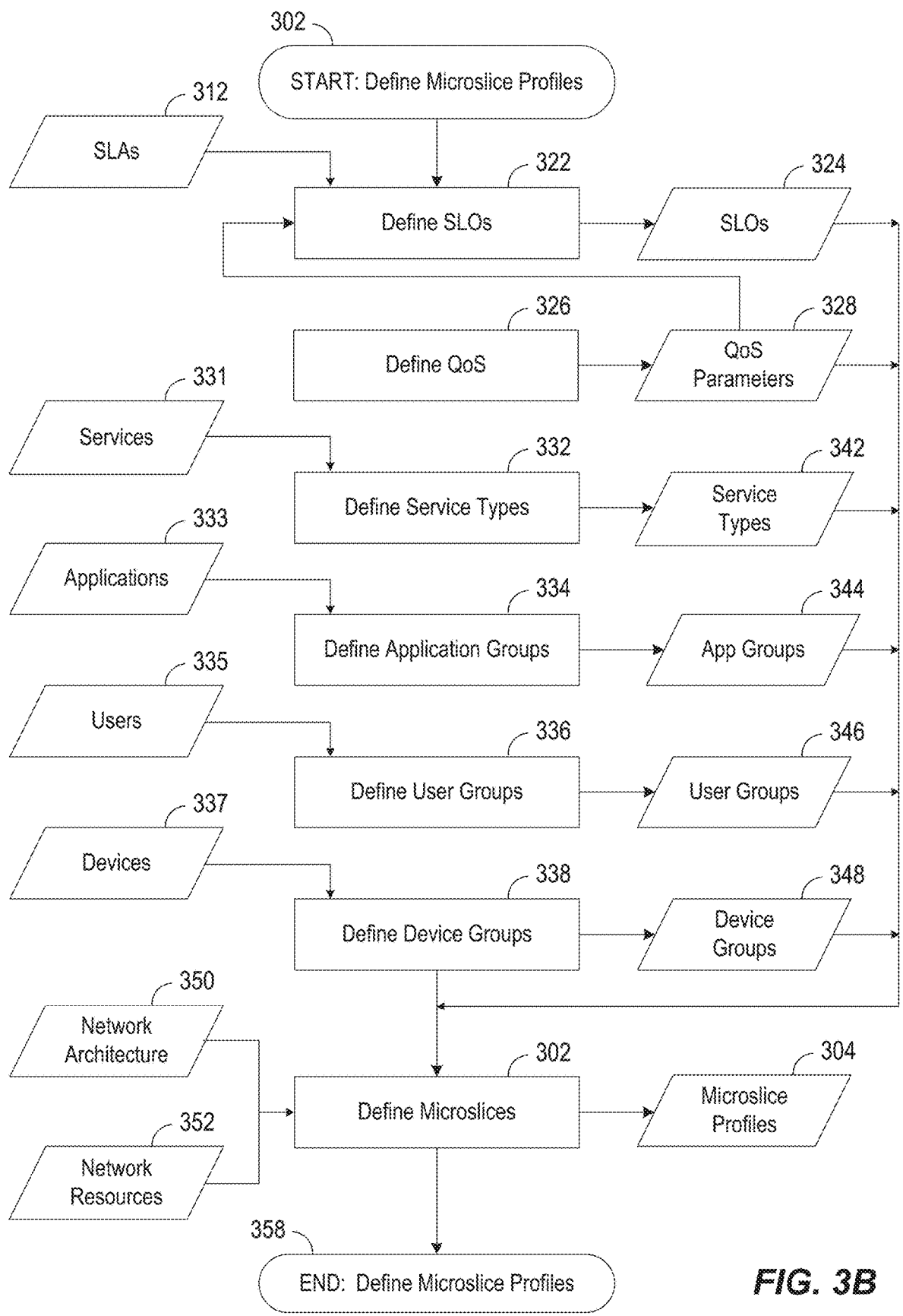
FIG. 3B is a flow chart of operations to define a microslice profile.
Figure 3C:
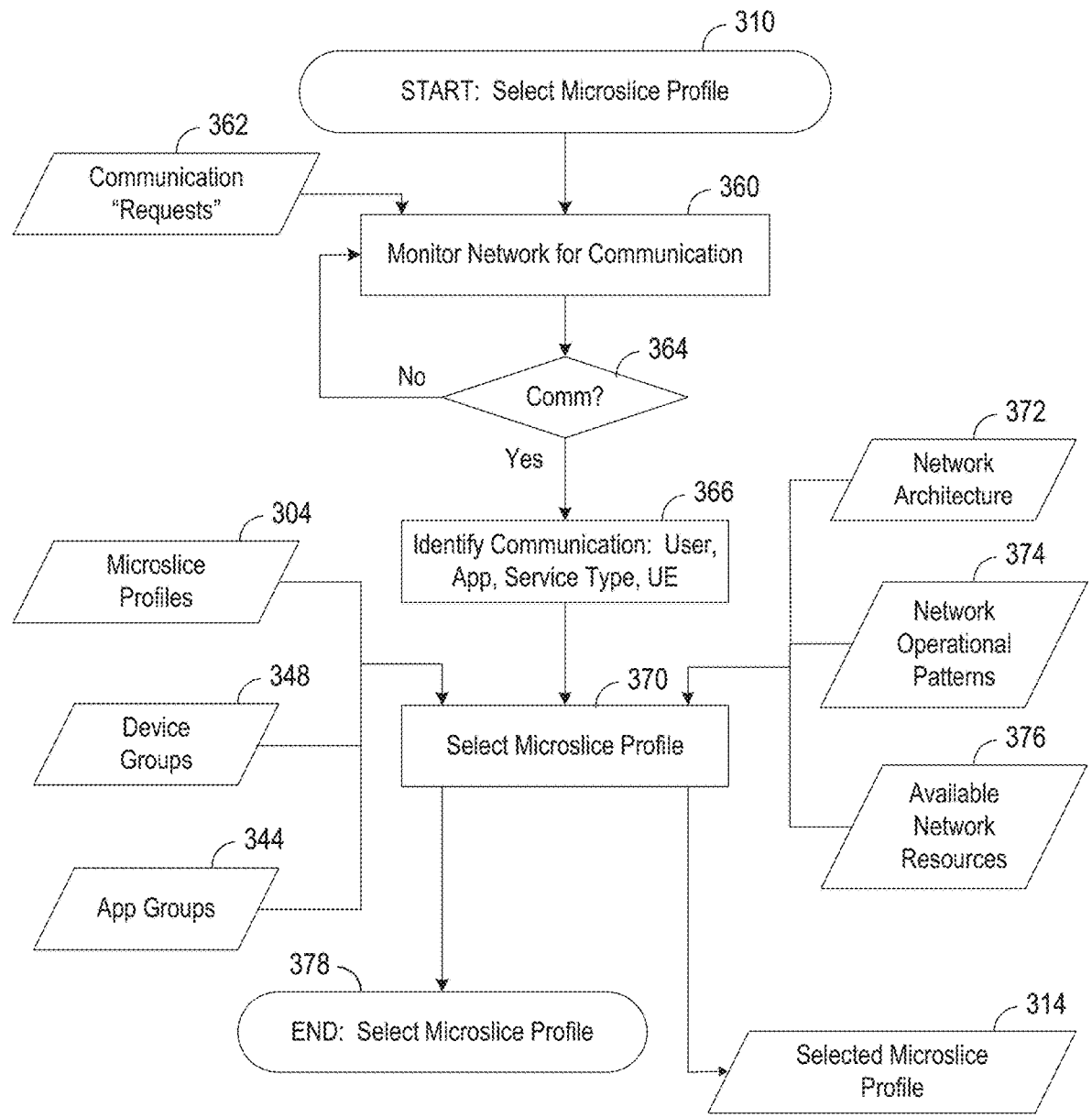
FIG. 3C is a flow chart of operations to select a microslice profile for a communication session with a UE.
Figure 3D:
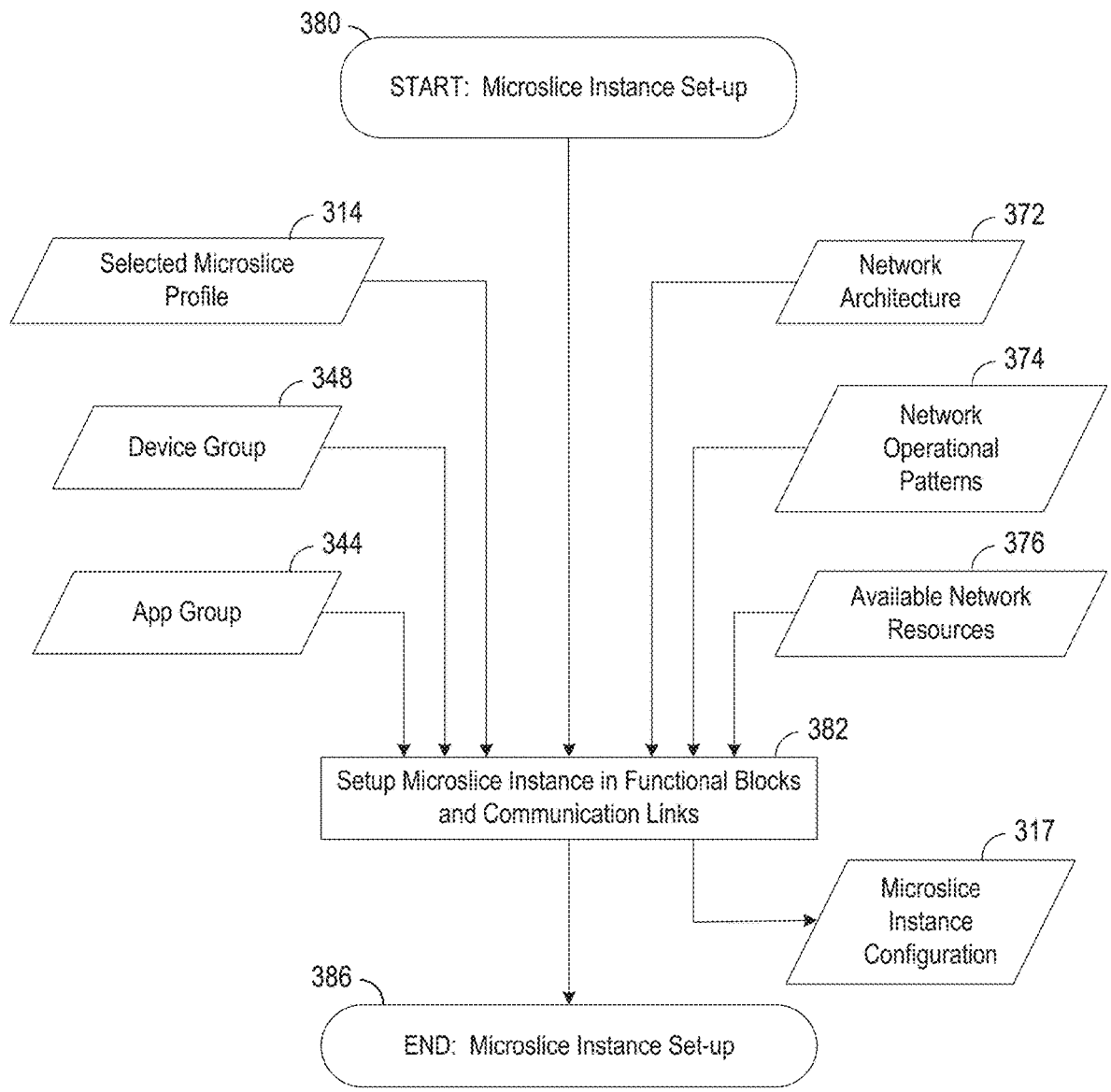
FIG. 3D is a flow chart that shows the inputs and operations to set up a microslice instance.
Figure 3E:
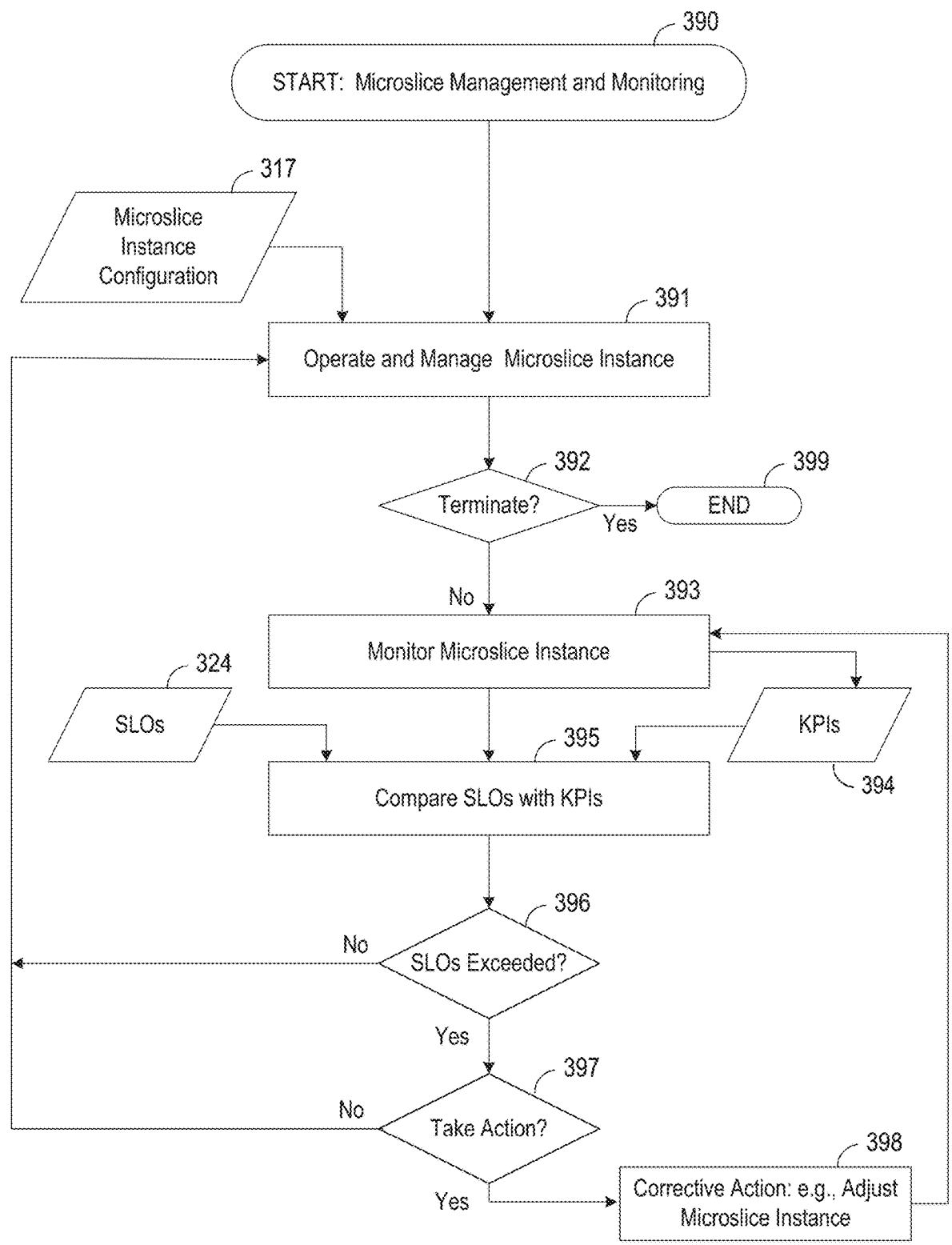
FIG. 3E is a flow chart of operations to manage and monitor microslices during operation.

FIGS. 3A-3E are flow charts that disclose methods to define and utilize microslices. Particularly, FIG. 3A discloses a general method to define, select, set-up and operate microslices. FIG. 3B discloses a method to define microslice profiles. FIG. 3C discloses a method to select a microslice profile responsive to a communication request. FIG. 3D discloses a method to set up a microslice for a particular communication. FIG. 3E discloses a method to manage and monitor the microslice after it has been set-up.

FIG. 3A is a high-level flow chart that summarizes operations to define, set-up and operate microslices (STEP 300). At STEP 310 microslices are defined (e.g., by a network administrator) utilizing a plurality of inputs such as the Service Level Agreements (SLAs) 312, Service Types 342, Applications and App Groups 344, and Users/UEs and User Groups 346. Responsive to any one or more of these inputs, one or more microslice profiles 304 are defined for use in the network. Also, Service Level Objectives (SLOs) 306 may be defined, which may be used to monitor a microslice instance operating in the network. Microslice profiles 304 and SLOs 306 are discussed in more detail elsewhere herein, for example with reference to FIG. 3B.

When a communication request 308 from a UE is received, the available microslice profiles 304 are compared with the communication request 308, and a microslice profile appropriate for the communication is selected (STEP 310), responsive to information provided by the device or other available information such as a device group 348 to which the device belongs, and other information that may be provided by the network. Selecting the microslice profile (STEP 310) is described in more detail elsewhere herein, for example with reference to FIG. 3C.

The selected microslice profile 314 is then supplied to the network or appropriate functional unit, which sets up the microslice instance (STEP 316) using available network resources to provide an instance configuration 317 in the network. Information regarding the device group 348 to which the device belongs may also be used to set up the instance, for example the device group information may indicate a particular network (e.g., VxLAN) for the device. Setting up the microslice instance (STEP 316) is described in more detail elsewhere herein, for example with reference to FIG. 3D.

The microslice instance configuration 317 can then be utilized for communication by the UE (STEP 318). The network manages, and monitors the microslice instance during operation. Operating, managing, and monitoring the microslice is described in more detail elsewhere herein, for example with reference to FIG. 3E. Operation ends (STEP 319) when the communication is no longer desired, and then the microslice configuration can be dismantled.

(5) Defining Microslice Profiles

FIG. 3B is a flow chart of operations to define a microslice profile. Generally, a microslice profile can be defined in many different ways to meet the purpose of outlining a communication path and QoS requirements for the communication path. A microslice profile defines the parameters of data flows to ensure that certain Quality of Service (QoS) requirements and Service Level Objectives (SLOs), and can also define the path of data flows to some extent. Advantageously, microslice profiles can be utilized to quickly and efficiently set up a microslice instance, which is a communication link with a wireless UE, that meets service requirements for the UE, allow the network to utilize its resources more efficiently, simplify network administration, and enhance services provided by the network. For this purpose, microslice profiles 304 can be defined using any of a number of communication aspects associated with the microslice, for example service type, user application, and groups of applications.

In one embodiment a microslice profile is defined by parameters that reside within fields in a microslice profile database. The parameters may, for example, include name, user applications, minimum guaranteed throughput, maximum allowed throughput, maximum packet delay bound, maximum packet loss rate and priority. These parameters may, for example be stored in a Home Subscription Server (HSS) in a 4G system (FIG. 9), or a User Data Management (UDM) in a 5G system (FIG. 10). A microslice profile may include a series of parameter levels, each level designated by an index "k"; i.e., each microslice index "k" (MSk) may be associated with a particular level of QoS parameters such as one QoS Class Indicator (QCI) value, a Guaranteed Bit Rate (GBR) value, a Maximum Bit Rate (MBR) value, and an Allocation and Retention Priority (ARP) value.

A number of inputs may be used together to create and define (STEP 302) the parameters of the microslice profiles 304. One of more of these inputs may be provided to define the microslices (STEP 302). These inputs may include SLOs 324, QoS parameters 328, Service Types 342, App Groups 344, User Groups 346, and Device Groups 348.

Service Level Objectives (SLOs) 324 are defined (STEP 322) for each microslice. SLOs 324 may be derived responsive to Service Level Agreements (SLAs) 312 of providers, QoS parameters 328, and other values, and provide different levels of service for the device. SLOs may defined (STEP 326) by the administrator, device requirements, or other sources. Generally, the SLOs for each microslice are utilized to monitor a microslice instance, and provide a means for evaluating the performance of the services running over a microslice instance.

FIG. 11 is a table 1100 of examples of service types. Service types 342 are defined (STEP 332) depending upon the services 331 that the network is expected to provide for the UE. The profile parameters of the microslices may be selected together (in STEP 302) to ensure certain Quality of Service (QoS) requirements and Service Level Objectives (SLOs) are met for different service types or applications such as:

- IP Camera and Computer Vision (CV) (e.g. facial recognition) applications
- Push to Talk (PTT) or Voice over IP (VoIP)
- VT (video telephone) or teleconferencing (e.g., zoom, Skype for business)
- Augmented Reality (AR)/Virtual Reality (VR)
- Remote control
- Robotics and automation
- Multimedia streaming
- Internet of Things (IoT) Sensor data analytics
- Best Effort traffic (ftp, web browsing etc.)

A microslice profile may include a service type. A Service Type may refer to communication for specific activities (e.g., videoconferencing, internet download, voice calls, music, IoT, Industrial IoT (IIoT), etc.) or more general activities. The Service Type may be specifically defined a number of ways, for example it may be defined by a 5-tuple (server IP address, destination IP address, port number, transport protocol, DSCP/TOS marking). A specific set of Quality of Service (QoS) requirements (parameters) such as bit rate, packet latency, and jitter or packet error rate may be associated with the microslice, based upon the Service Type.

Another input to define a microslice profile may be an application group. Application groups 344 are defined (STEP 334) depending upon the services 333 that the network is expected to provide for the UE. The microslice profile may also be associated with one or more applications, or it may be associated with one or more groups of applications, and they may be specified as part of the profile.

For the implementation in the enterprise use cases, for each application or a group of similar applications or service types, administrators can define a microslice and specify QoS constraints as described above. In some embodiment AI may be utilized to automatically classify application into groups and/or microslices. Advantageously, using the AI option and other automated techniques to associate applications with microslices and/or applications, can provide automated classification of applications into groups and automatic association with a microslice, providing greater efficiency and avoiding manual interaction. For example, when a new application like Disney+ arrives, it can automatically get assigned to a Streaming Microslice, together with other streaming apps like YouTube, NetFlix, Amazon Prime, etc.

Another input to define a microslice profile may be the user or user group. User groups 346 are defined (STEP 336) depending upon the user 335 that the network is expected to provide for the users. User groups may be set up by the network administrator, for ease of administration, or to provide preferred service to a particular group. The microslice profile may be associated with one or more users, or it may be associated with one or more groups of users, and the users or user groups may be specified as part of the profile.

Another input to define a microslice profile 304 may be device groups. Device groups 348 are defined (STEP 334) depending upon the user 333 that the network is expected to provide for the UE. Device groups may be set up by the network administrator, for ease of administration, or to provide preferred service to a particular group of devices. The microslice profile may be associated with one or more devices, or it may be associated with one or more groups of devices, and the devices or device groups may be specified as part of the profile. Devices groups 348 are particularly useful for enterprise networks, and are described elsewhere in more detail.

Additional inputs to that may be used to define a microslice profile 304 includes the network architecture 350 in which the microslice profiles will be utilized, and the network resources 352. Some or all of these inputs are processed to create microslice profiles appropriate for the network and its communication needs.

FIG. 4 is an example of a microslice profile 400. In this example the microslice is defined by parameters that reside within fields. The parameters may, for example, include name, allowed application definitions, minimum guaranteed throughput, maximum allowed throughput, maximum packet delay bound, maximum packet loss rate and priority.

(6) Selecting a Microslice Profile

FIG. 3C is a flow chart of operations to select a microslice profile (STEP 310, FIG. 3A) for a communication session with a UE. The wireless network is monitored (STEP 360) to detect a request 362 for communication, and when a communication is detected (STEP 364), then information from the request 362 or other available information may be utilized to identify (STEP 366) data and other information relating to the communication, such as the user, application, service type, and UE (device). Utilizing this information and other information, a microslice is selected (STEP 370) from the microslice profiles 304 to provide a selected microslice profile 314. Other information that may be used to select a microslice profile includes the network architecture 372, network operational patterns 374, and available network resources 376. And if the UE is in a device group 348 that is associated with one or more microslices, then the device groups 348 may be used to select a microslice profile. Similarly, if the identified application is in a group 344 associated with one or more microslices, then app group 344 may be used to select the microslice profile.

Following is an example of selecting a microslice profile by user application. User application types can be identified in a number of ways, for example via:
  IP address and/or port number of the server (or destination);
  IP address and/or port number of the client (or source)/;
  QoS markings and DiffServ differentiated services code point (DSCP); and/or
  Transport protocol used (e.g., TCP or UDP).

FIG. 5 shows an example of definitions that indicate which applications are associated with a particular microslice. For example, a microslice may be associated with applications that meet the criteria of the first entry, which allows the microslice to be used by any application. Microslices associated with applications that comply with a second entry can only be used by applications defined in accordance with definition of "Application 1" (i.e., having a destination IP address of 1.1.1.1, destination Port 123, etc.).

Further options for identifying applications to be associated with a microslice include:
  DPI (Deep Packet Inspection) for URL/headers,
  AI (Artificial Intelligence) or Machine Learning for auto assignment,
  LTE/5G device dedicated bearer request,
  5G Signaling: NSSAI (Network Slice Selection Assistance Information),
  DNS lookups,
  Next Gen Firewall query,
  SD-WAN, and
  APIs for applications to select a microslice.

(7) Setting Up the Microslice Instance

Figure 16:
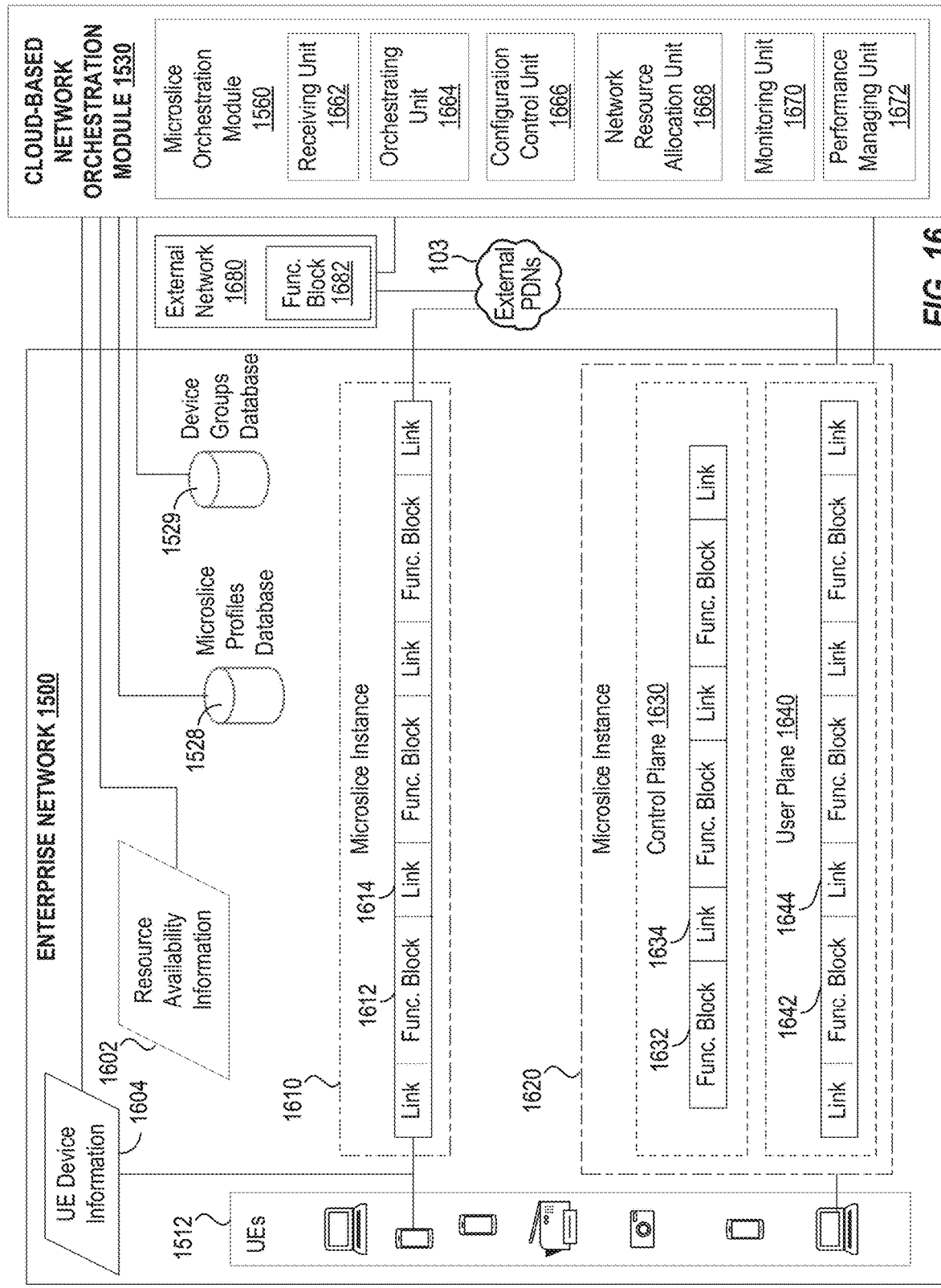
FIG. 16 is a block diagram of a wireless communication system including an enterprise network and a microslice orchestration module, illustrating microslices implemented in the enterprise network.
Figure 17:
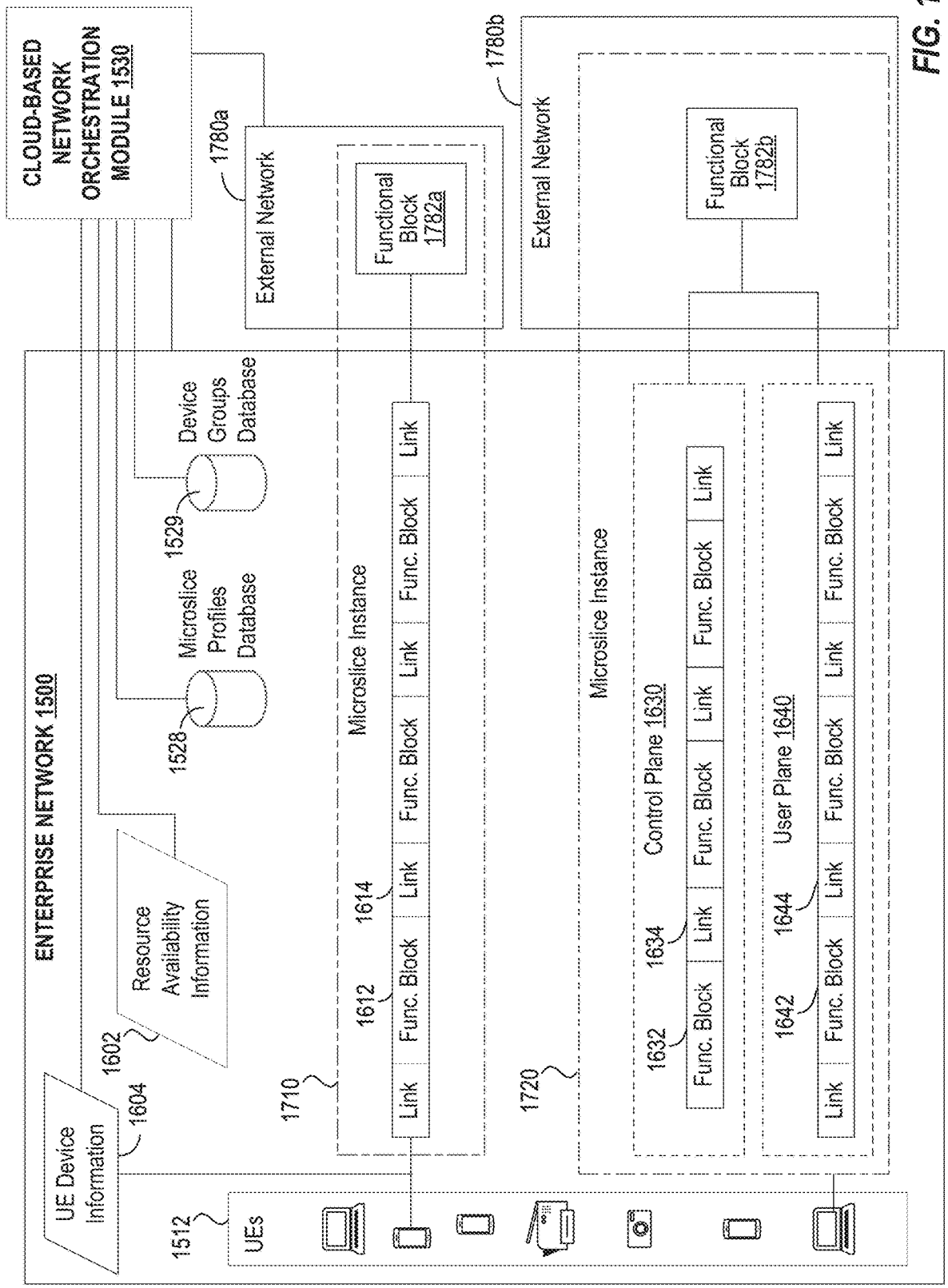
FIG. 17 is a block diagram of a wireless communication system including an enterprise network and a microslice orchestration module, illustrating microslices implemented across the enterprise network and external networks.

FIG. 3D is a flow chart that shows the inputs and operations to set up a microslice instance, starting at 380. Inputs to set up a microslice instance include the selected microslice profile 314, network architecture 372, network operational patterns 374, and available network resources 376. The device groups 348 and the app groups 344 may also be utilized. These inputs may be utilized to select a microslice instance (STEP 382) using functional blocks and communication links in an enterprise network and optionally external networks. The result of setting up a microslice instance (STEP 382) is the microslice instance configuration 317. FIGS. 16 and 17 are block diagrams that illustrate microslice instances implemented with functional blocks and communication links.

Using a microslice instance, a data flow may be set up to and from the UE, through the RAN, Core Network, and other possibly other servers or networks, to an external server. The microslice is orchestrated by a Network Orchestrator. Note that there can be "N" microslices (MS1, MS2, . . . , MSN) defined in any particular implementation.

In an enterprise environment, as a microslice instance is created, traffic can be routed through multiple functional blocks that are inter-connected by communication links. One or more of the functional blocks may be a pre-existing corporate LAN (e.g., via VLAN or VxLAN). The choice of the functional blocks may be made for the purpose of ensuring specific security and access control rules are met, and/or ensuring that specific QoS and Service Level Objective (SLO) specifications are met. The routing, and/or the specific security and access control rules, can be specified by the administrator as part of the microslice profile, or may be orchestrated when the microslice instance is configured.

(8) Managing and Monitoring the Microslice Instance

FIG. 3E is a flow chart of operations to manage and monitor microslices during operation. Operation starts (STEP 390), and the microslice instance configuration 317 is then managed and operated (STEP 391) using network components and management techniques, such as described with reference to FIGS. 15, 16, and 17. Operation continues until terminated (STEP 392) by the network, which may happen for a number of reasons, such as the end of the communication session, which ends (STEP 399) operations.

While operation is continuing, the microslice instance is monitored (STEP 393) at one or more of the functional blocks and communication links (described e.g., with reference to FIGS. 15, 16, and 17), to provide Key Performance Indicators (KPIs) 394. In some embodiments the microslice instance may be monitored at all of the functional blocks and communication links. In addition, the instance may be monitored end-to-end or between nodes.

The KPIs 394 are compared (STEP 395) with the SLOs 324 defined in the selected microslice profile. If the SLOs 324 are met (STEP 396) then operation returns to STEP 391, to continue to operate and manage the microslice instance. However, if one or more of the SLOs are not met, than the network decides whether or not to take action (STEP 397) based upon the results of the comparison (STEP 395) and any other information that may be useful. If the network decides not to take action (STEP 397), then operation returns to STEP 391, to continue to operate and manage the microslice instance. However, if the network decides to take action (at STEP 397), then corrective action is taken (STEP 398). The microslice instance may be adjusted, such as by re-configuration in some way. In one embodiment the microslice configuration can be re-configured responsive to the KPIs and the microslice profile (e.g., the SLOs in the microslice profile) and the microslice instance is dynamically adapted responsive to the revised microslice configuration.

(9) Example

Figure 6:
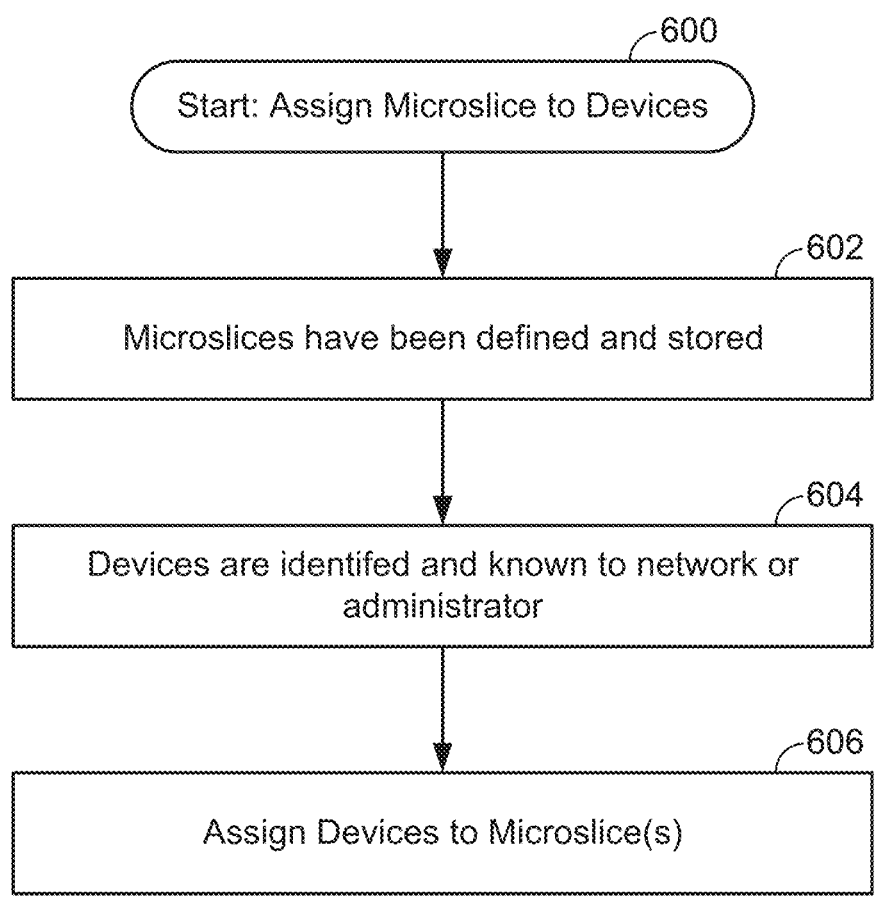
FIG. 6 is a flow chart of a method for assigning a microslice to devices.

Reference is now made to FIG. 6, which is a flow chart of operations (STEP 600) to associate devices with a microslice profile, in one example. The term "devices" includes UEs and other devices or components of the communication network such as routers or APs. Microslice profiles are defined and stored in an accessible server (STEP 602), as described herein. Many different microslice profiles may be defined in any particular embodiment, some embodiments of which may be part of an LTE/5G implementation.

Next, the devices are assigned to one or more microslices (STEP 606). Generally, when a device or other entity becomes known to the network or administrator, or otherwise requests service, the microslice(s) that best matches the needs of the device should be assigned to provide service to the device. Assignment can be made in a number of ways, for example by matching the device's requested service type with appropriate microslices. In other embodiments, one or more other parameters associated with the microslice can be compared with the requested service type or other parameters associated with the device to determine which microslice(s) would be best suited to carry data to and from the device. Another way of making an assignment is by checking to determine if the device is a member of a device group (see below) and if so, utilizing the group's previously defined microslices.

In one example product implementation, a default microslice profile called 'Default' is included in the product shipment, and therefore is defined "out of the box" (i.e., pre-defined in the product). This Default microslice profile may, for example, be without any QoS guarantees, commonly known as best effort (BE). Thus, when the system is initially installed, for example an entire device group (e.g., all UEs that are cell phones) or in some embodiments all devices (or device groups, discussed below) can be assigned to this default microslice. What this means is that all those devices will be able to, at least, setup a default microslice for all communications, without any QoS guarantees, which is advantageous for initial installation and administration. In one implementation when this default microslice profile is defined (out of the box), all fields may be set to blank, the application definitions field may be set to 'Permit All', and priority may be set to 15.

(10) Device Groups

Device groups 348 are discussed briefly above with reference to FIG. 3B, the following provides additional disclosure. To simplify administration and implementation of microslices, some embodiments may include device groups that may be utilized by a network administrator to associate with one or multiple microslices. Examples of devices that might be assigned to one or more different device groups can include devices such as:
Smart Phones,
Tablets,
Handheld Mobile Devices,
Point of Sale (POS) terminals, and
Routers/access points for backhaul.

In one example implementation, a default device group is set up prior to installation (i.e., available "out of the box"), and therefore will be available during installation. This default device group may be called "Default" and unless otherwise specified, each device can automatically be assigned to the "Default" device group to facilitate initial installation and administration.

A device group is a flexible grouping of devices. Using device groups, enterprises can, for example, flexibly create categories for their users/devices that have similar usage, service, coverage and capacity needs in the network. Since this is a flexible grouping, enterprises are at liberty to define these groups to match their current profiling and more efficiently manage devices and network resources.

A device group can be defined with specific information such as device group name, administrator name, a trusted/untrusted field, VLAN or VxLAN ID and DHCP server address. FIG. 7 shows an example device group definition, including Field Name, a Value Example for that field, and a Field Description for that field. In FIG. 7 the Field Names specific to this example include: Device group name, Admin, Trusted, VLAN or VxLAN ID, and DHCP.

Mobile devices (UEs) in an enterprise can be associated with a device group, which may include many mobile UEs. In some embodiments, a particular UE can be associated with only one group.

The device may be associated with a group by an administrator, for example, or may be associated in response to information provided by the device, or may be associated by default. In one implementation, the association can be implemented as a containerized application running in the Core Network, on Kubernetes or any other such system. Kubernetes is an open-source container-orchestration system for automating application deployment, scaling and management. Containers have become popular as enterprises use DevOps for faster development and deployment of applications. Containers include everything needed to run software, including files and libraries. Containers combine the libraries of an application or microservice into one deployable unit that does not deplete the CPU or memory resources of the host operating system and provide isolation for different services running on the same CPU.

In one preferred implementation, the core network (EPC) function can be implemented as a containerized application running on Kubernetes. This allows following benefits for the microslicing implementation described herein, such as:

1. Breaking down the core network (EPC) into microservices provides "dedicated" or "isolated" resources for each microslice.
2. Scaling each microservice intelligently and independently honors the SLO for microslices.
3. Upgrading each service independently and over the air with zero touch from the network administrators reduces costs and simplifies the upgrading process.
4. Dynamically moving services between the customer's edge and cloud instances helps to serve bursty workloads.
5. The ability to log and get necessary metrics for monitoring the performance of each microslice, ensures each UE is getting an appropriate level of service, and improves network efficiency.
6. Also, this allows the network (RAN and EPC) to be run as a network infrastructure service. The microservices architecture provides the ability to spin up the resources on the cloud and on demand so technically all of the network infrastructure can be provided as a cloud native application.

FIG. 8 is a table showing an example of how microslices can be associated with different device groups. For example, FIG. 8 shows that Device Group 1 is assigned to the microslice called "Streaming", to the microslice called "Video Conf" and to the "Default" microslice. In addition to a device group being associated with more than one microslice, it is likely that more than one device group will be associated with one or more of the same microslices depending on the needs of the enterprise. If multiple microslices are enabled for a device group, some or all of the applications running on a device within the device group may be associated with a particular one of the enabled microslices. Alternatively, a default microslice can be used for any application or services that are not associated with any other microslices. Alternatively, in the case where an application or service is associated with multiple microslices, a decision mechanism may be provided to select between multiple microslices.

(11) Implementation: 4G, 5G, WiFi

The microslices described herein will typically be implemented in LTE and/or 5G wireless communication networks; that is, communication networks that are constructed according to the specifications of Standard Development Organizations (SDOs) such as 3GPP. They can also be implemented in WiFi networks, or any suitable network. In some embodiments that implement two or more of these networks, the packets in a communication stream can be divided between these networks.

The basic components of these communication networks are well-known, and need not be discussed in detail. However, for purposes of description, these communication networks are discussed briefly herein. Much additional information is available in the current SDO specifications, such as 3GPP specifications TS 21.905, TS 22.852, TS 23.002, TS 23.203, TS 23.501, TS 36.300.

Figure 9:
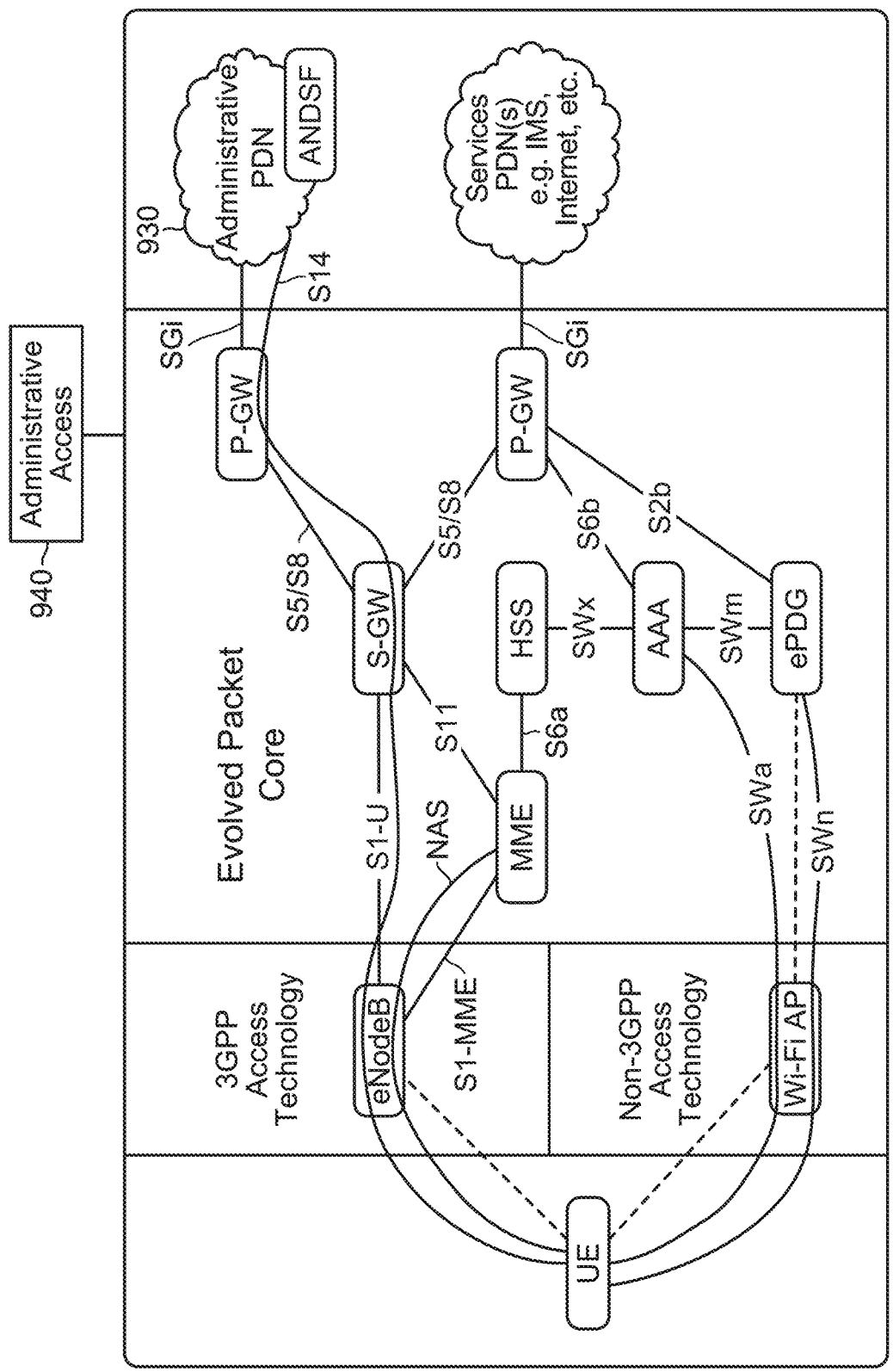
FIG. 9 is a block diagram of a 4G wireless communication network.
Figure 10:
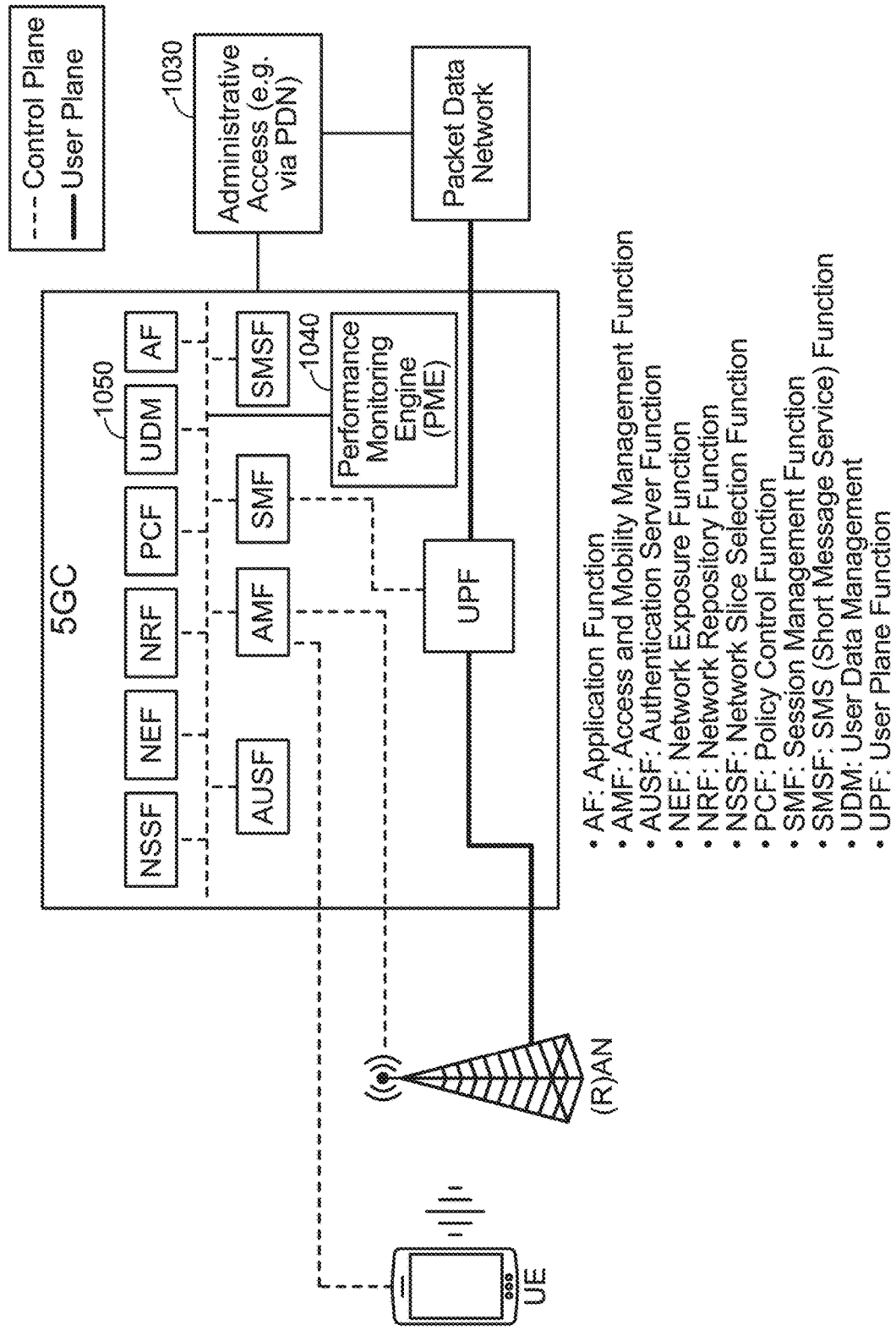
FIG. 10 is a block diagram of a 5G wireless communication network.

Reference is now made to FIG. 9, which is a network diagram showing an architecture of an LTE (4G) wireless communication system. The 4G network in FIG. 9 has a flat, all-IP architecture with separation of control plane and user plane traffic. Acronyms are shown in the network blocks. The following is a list of acronyms shown in the network blocks and other acronyms used in 4G systems:

ANDSF: Access Network Discovery and Selection Function
APN: Access Point Name
ARP: Allocation and Retention Priority
AMBR: Aggregate Maximum Bit Rate
ePDG: Evolved Packet Data Gateway
E-RAB EPS Radio Access Bearer
EPC: Evolved Packet Core
EPS: Evolved Packet switched System)
GBR: Guaranteed Bit Rate
HSS: Home Subscription Server
MBR: Maximum Bit Rate
MME: Mobility Management Entity
PCC: Policy Control and Charging
PCRF: Policy and Charging Rules Function
PDB: Packet Delay Budget
PDN: Packet Data Network
PELR: Packet Error Loss Rate
P-GW: Packet Gateway
QCI: QoS Class Identifier
QoS: Quality of Service
RAB: Radio Access Bearer
RRC: Radio Resource Control
SAE: System Architecture Evolution
SDF: Service Data Flow
S-GW: Serving Gateway
TFT: Traffic Flow Template
VoIP: Voice over IP
Wi-Fi AP: WiFi Access Point A main component of the 4G architecture shown in FIG. 9 is the Evolved Packet Core (EPC), which is the Core Network in this embodiment. Some components are described below.

MME (Mobility Management Entity): The MME is the key control-node for the LTE access-network. It is responsible for idle mode UE (User Equipment) paging and tagging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the HSS for roaming UEs.

SGW (Serving Gateway) The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs, the SGW terminates the downlink data path and triggers paging when downlink data arrives for the UE. It manages and stores UE contexts, e.g., parameters of the IP bearer service, network internal routing information. It also performs replication of the user traffic in case of lawful interception.

PGW (Packet Data Network Gateway): The PDN Gateway provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception, and packet screening. Another key role of the PGW is to act as the anchor for mobility between 3GPP and non-3GPP technologies such as WiMAX and 3GPP2 (CDMA 1x and EVDO).

HSS (Home Subscriber Server): The HSS is a central database that contains user-related and subscription-related information. The functions of the HSS include functionalities such as mobility management, call and session establishment support, user authentication and access authorization. The HSS is based on the pre-Release-4 Home Location Register (HLR) and Authentication Center (AuC).

ANDSF (Access Network Discovery and Selection Function): The ANDSF provides information to the UE about connectivity to 3GPP and non-3GPP access networks (such as Wi-Fi). The purpose of the ANDSF is to assist the UE to discover the access networks in their vicinity and to provide rules (policies) to prioritize and manage connections to these networks.

ePDG (Evolved Packet Data Gateway): The main function of the ePDG is to secure the data transmission with a UE connected to the EPC over untrusted non-3GPP access, e.g., VoWi-Fi. For this purpose, the ePDG acts as a termination node of IPsec tunnels established with the UE.

An Administrative PDN is provided and shown at 930 in FIG. 9, connected to the EPC, that allows administrative access to the components. Alternatively, there may be administrative access 940 via a direct (non-PDN) connection to the EPC. In one microslice implementation, administrative operations to define and setup the microslice in the EPC, and monitor and operate the microslice instance in the communication network, can be performed via the Administrative PDN 930 or Administrative Access 940.

Reference is now made to FIG. 10, which is a network diagram of an LTE (4G) wireless communication system. In this 5G architecture, a Core Network is referenced as 5GC (5G Core). In FIG. 10, acronyms are shown in the network blocks. Following is a list of acronyms shown in the network blocks and other acronyms used in 5G systems:

AF: Application Function
AMF: Access and Mobility Management Function
AUSF: Authentication Server Function
NEF: Network Exposure Function
NRF: Network Repository Function
NSSF: Network Slice Selection Function
PCF: Policy Control Function
PCEF: Policy and Charging Enforcement Function
SD: Slice Differentiator
SMF: Session Management Function
SMSF: SMS (Short Message Service) Function
SST: Slice/Service Type
UDM: User Data Management
UPF: User Plane Function Administrative access 1030 is provided to the 5GC, such as via a PDN connected securely to the 5GC, which allows administrative access to the components such as the UDM in the 5GC. In one microslice implementation, administrative operations in the EPC to define and setup the microslice, and to monitor and operate the microslice instance throughout the communication network can be performed via this Administrative access. In one example, the User Data Management (UDM) function 1050 may be utilized to set up and store the data fields relating the microslices, service types, device groups, applications and other useful information.

(12) Monitoring and Key Performance Indicators (KPIs)

During operation, a microslice instance is monitored. As previously discussed, Service Level Objectives (SLOs) are associated with each microslice. The SLOs provide a means of evaluating the performance of the services running over the respective microslice. In order to measure the performance of the network, and to help to assess whether or not the SLOs for each microslice are being met, Key Performance Indicators (KPIs) may be measured and reported at functional block, each communication link, and end-to-end. The measured KPIs can then be compared with the desired SLOs to determine the extent to which performance goals are being met. The KPIs that will be compared with the SLOs may include the following in one example:

Packet Throughput (IP layer),
Packet latency (IP layer—between EPC and UE),
Packet loss rate (IP layer—between EPC and UE), and
Packet jitter rate (IP layer—between EPC and UE).

The KPIs can be monitored by the RAN, Core Network and/or devices, in combination or individually. In one implementation, a preferred method is to utilize only the Core Network to measure these KPIs directly using a Performance Monitoring Engine (PME), shown at 1040 in FIG. 10. In some embodiments, the EPC generates diagnostic traffic to measure packet latency, loss rate and jitter between the EPC and the device. In one embodiment the measurements can be achieved by using ICMP protocol, and monitoring round trip characteristics of IP packets generated by the ICMP applications. The Internet Control Message Protocol (ICMP) is a supporting protocol in the Internet protocol suite as defined. ICMP is used by network devices, including routers, to send error messages and operational information indicating success or failure when communicating with another IP address; for example, an error will be indicated when a requested service is not available or if a host or router could not be reached. ICMP differs from transport protocols such as TCP and UDP in that ICMP is not typically used to exchange data between systems, nor is it typically employed by end-user network applications.

These measurements would typically be round trip packet measurements and in that case the measurement would not give specific indication of downlink versus uplink performance. So, if the measurements are round trip, for simplicity, KPIs can be assumed to be equally contributed by downlink and uplink traffic. The same method can also be used to measure the other KPIs.

For certain applications running over TCP/IP protocols, inspection of the TCP/IP packet headers of the ongoing data traffic can be used to measure the KPIs.

Round trip delay measurement: TCP ACK packet header (acknowledgment number field) indicates which specific TCP packet (sequence number field) is being acknowledged. Or TCP/IP header files such as ("TSval" ad TSecor") can be used to identify which specific TCP packet is acknowledged. Hence round-trip delay can be measured between the corresponding TCP packet and TCP ACK packet at EPC (by comparing the time stamp recorded from the original TCP packet with the corresponding ACK packet reception time). This operation can be performed both for downlink and uplink directions, giving a measurement of RTT between the EPC and UE, and between the EPC and application server.

Packet retransmission rate: TCP headers (sequence number field) can be used to get a measure of packet retransmission rate via detection of repeated sequence numbers. Also, TCP ACK packet headers (acknowledgment number field) can be utilized for same purpose. The operation can be done both for the downlink and uplink direction giving a measurement of packet retransmission rate between EPC and UE, and between EPC and application server.

For non-TCP/IP traffic: Artificial Intelligence (AI) techniques can be used to learn traffic patterns and associated KPIs such as packet latency, loss rate and jitter. For example, different multimedia applications may adjust traffic rate and packet sizes based on available throughput and packet error rate, or control the traffic associated with the application so that it has a certain behavior correlated with some of the network KPIs.

Also, if a PME 1040 (FIG. 10) is implemented, it may utilize any additional information that can be provided by the RAN and UE. For example, eNB (RAN)-provided performance metrics can include: 1) the achieved Packet Error Rate (PER) (MAC and RLC layer) for each QoS flow; and 2) PRB resource utilization for each QoS flow. UE-provided performance metrics can include achieved PER (MAC, RLC and IP layer) for each QoS flow; and channel quality (SNR). Any of this information can be useful to help determine if the SLOs are being met.

(13) Load Control, Admission Control, and Alarms

As the number and amount of data flows increase and the LTE/5G system becomes more and more loaded, the KPIs will eventually show that performance is degrading. Degradation of performance may result from any of a number of factors, such as the load reached at the eNB, or limitations in the EPC or other parts of the system. If performance has degraded to a certain level, as observed by the KPIs, options are available to improve the system performance, including load control, admission control, and alarms, either individually or in combination.

The Performance Monitoring Engine (PME) 1040 preferably can update the current KPIs in real time, and provide the updated KPI values to an admission control function and a load control function for the RAN and EPC network, so that the current KPIs are available if and when needed. The current KPIs may include, or be sent with, an indication of a specific QoS flow, microslice, eNB and/or PSE associated with the KPI.

(14) Load Control

Figure 12:
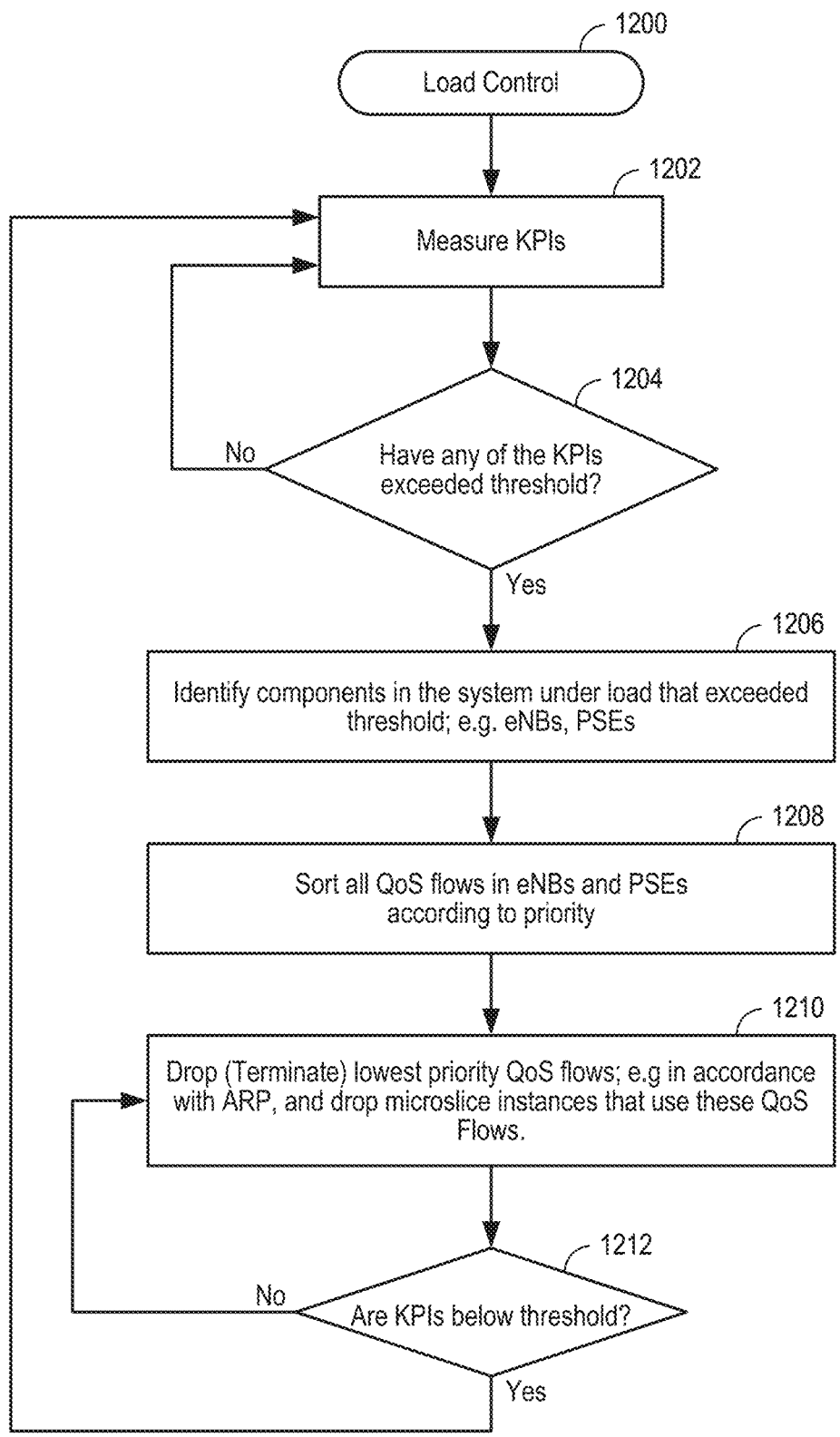
FIG. 12 is a flow chart of operations to provide load control in a system utilizing microslices.

If performance has degraded to a certain level as measured by the KPIs, one option is to perform load control operations, in which lower priority traffic is dropped (e.g., by the EPC) to accommodate traffic with higher priority. Reference is now made to FIG. 12 to illustrate a load control operation (STEP 1200). The KPIs are measured (STEP 1202), preferably continuously, and when any of the KPIs exceeds threshold (STEP 1204); e.g., if any specific KPI having index j (KPIj) passes a KPIj_load_control threshold (which may pre-determined responsive to the respective SLOs) for a specified period of time, the specific components in the service under load (e.g., eNBs, the PSEs) should be identified (STEP 1206). Using this information, all the QoS flows in the specific eNB, and PSE may be sorted (STEP 1208) according to their priority, such as defined by their QCI. The lowest priority QoS flows should be dropped (STEP 1210), for example, in accordance with their Allocation and Retention Priority characteristics, until a decision is made (STEP 1212) that the KPIs, and particularly the specific KPIj under evaluation, satisfies the KPIj_load_control value. If a QoS flow in a microslice instance is dropped, then the microslice instance will be dropped; however, the microslice(s) that utilize the QoS flows that are dropped can reconfigure, and utilize another set of QoS flows to create their microslice instance.

(15) Admission Control

Figure 13:
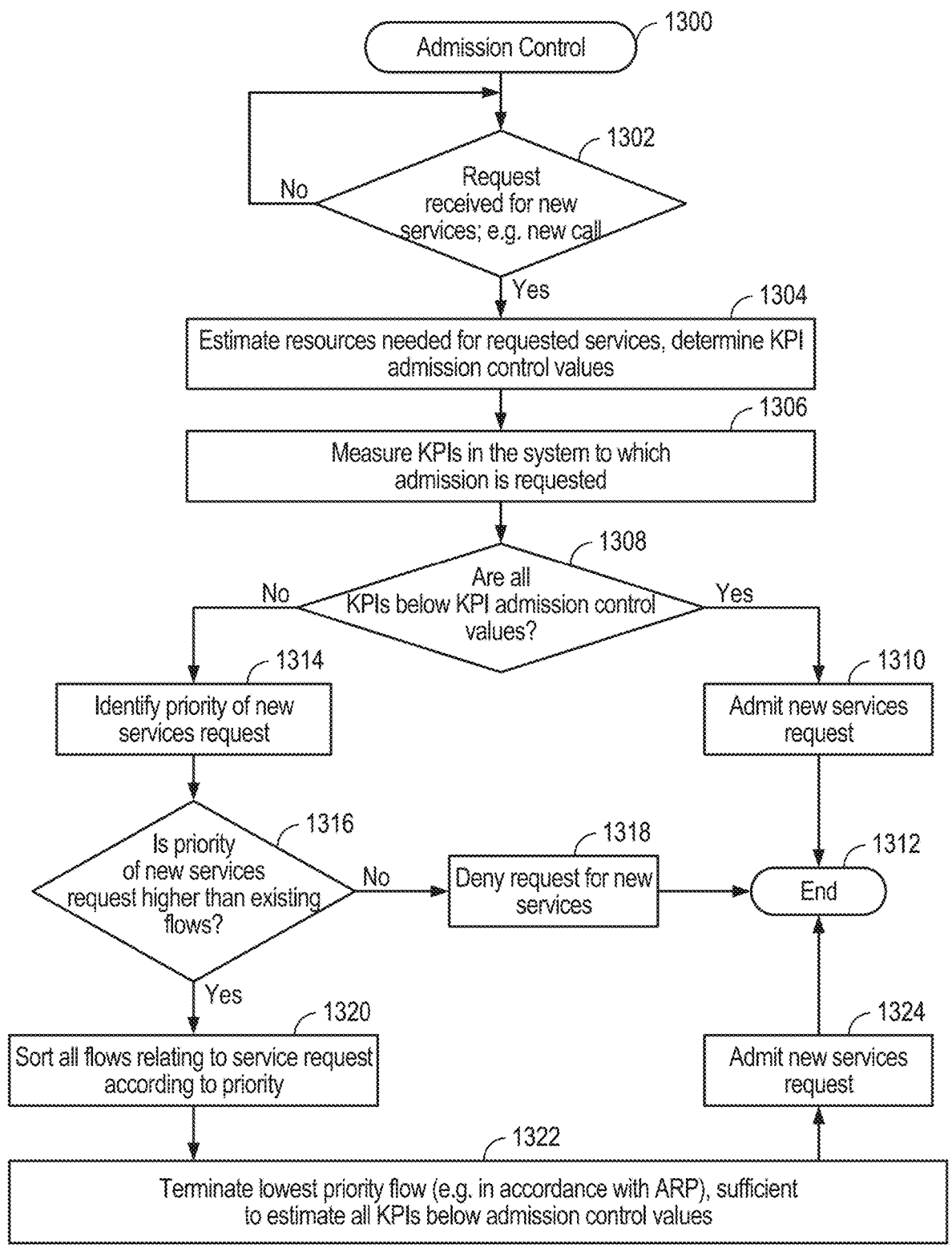
FIG. 13 is a flow chart of operations to provide admission control in a system utilizing microslices.

At a certain load, if performance has degraded to a certain level as measured by the KPIs, admission control operations may be performed, in which no more new calls and/or services will be admitted to the system, in order to keep the KPIs at the desired levels for all other UEs and other devices in the system. Reference is now made to FIG. 13, which is a flow chart that illustrates admission operations (STEP 1300). Operation remains in a waiting state (STEP 1302) until a request for new services (e.g., a new call or new microslice setup request) is received. After the new services request is received, the system estimates the resources needed for the new services, and then determines KPI admission control values (STEP 1308). The amount of resources needed for the incoming call be estimated based on microslice requirements and other sources, such as analysis of ongoing flows utilizing AI/ML (Artificial Intelligence/Machine Learning) techniques. This estimate, and any other useful information, can be used to determine KPI admission control values.

A determination is made (STEP 1308) to determine if all the KPIs are below the KPI admission control values; i.e., for index j, if all KPIjs are below the KPIj_admission_control values. If so, then the new call or QoS flow can be admitted to the system (STEP 1310) and admission control operation ends. (STEP 1312) Otherwise, the system identifies the priority of the new services request (STEP 1314), and determines (STEP 1316) if the incoming request has a higher priority and has an ARP (Allocation and Retention Priority) that is above some of the existing flows in the eNB and the PSE desired for the new services. If the incoming request has a lower priority, then the request for new services is denied (STEP 1318), and operation ends (STEP 1312). However, if the incoming request has a higher priority, then the flows are sorted according to priority (STEP 1320) and lower priority flow(s) are terminated (dropped similar to load control section above) (STEP 1322) to create enough resources for the incoming services request. The new services request is then admitted (STEP 1324), and the admission control operation is complete (STEP 1324).

Note that, in addition to the KPI metrics, a BS/AP may have other metrics available to monitor and control load, such as the maximum number of RRC-Connected users allowed. These other metrics can also be used to perform admission control at the eNB level.

As with load control, if a QoS flow in a microslice instance is refused admission or dropped, then the microslice instance will be dropped; however, the microslice(s) that utilize the QoS flows that are dropped can reconfigure, and utilize another set of QoS flows to create their microslice instance.

(16) Alarms and Control Procedures

Figure 14:
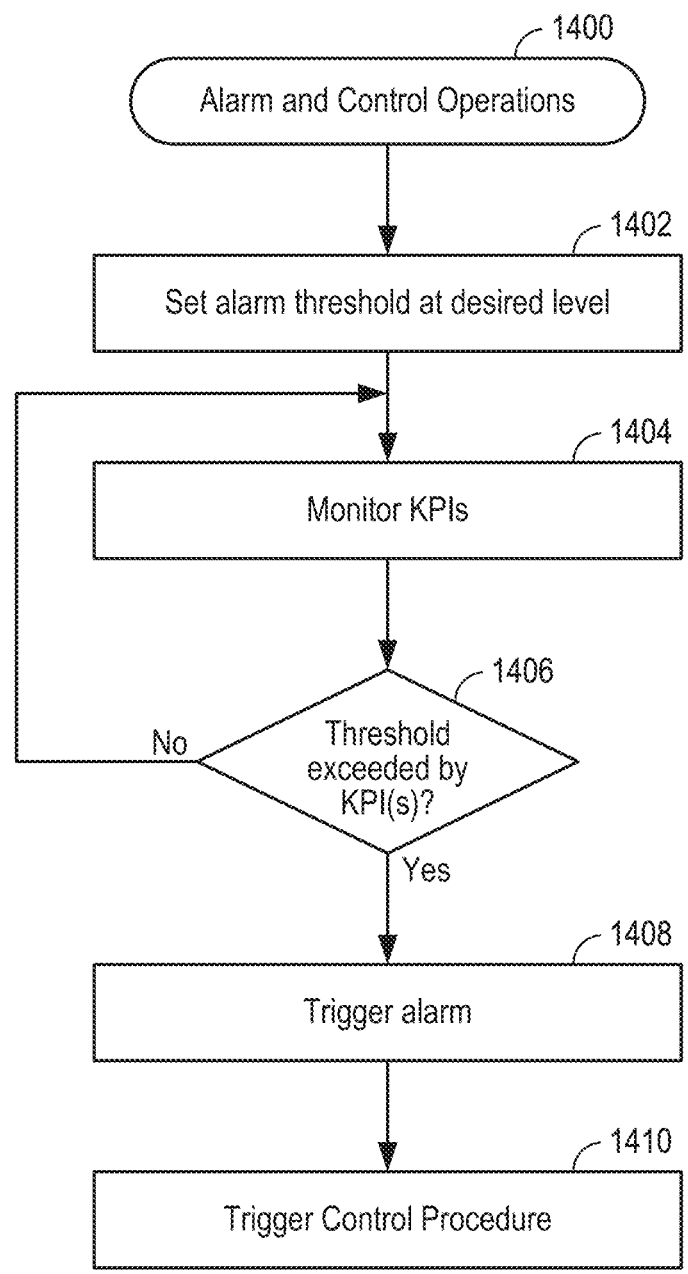
FIG. 14 is a flow chart of alarm operations that may be triggered under some circumstances, also showing a control procedure that may be run in response to triggering an alarm.

In a preferred embodiment, if it appears that an SLO may be exceeded, an alarm may be triggered, and/or a control procedure may be utilized. The alarm procedure may be used for any purpose, for example it may be used to alert a user or a system component of a current or impending problem, or it may be used to notify and trigger load control and/or admission control as described above. Reference is now made to FIG. 14, which describes Alarm and Control Operations (STEP 1400). A specific threshold for a particular alarm is set at a desired level (STEP 1402). In one embodiment these thresholds can be set to a certain value with respect to the maximum limit allowed by the SLOs. For example, a KPIj_admission_control may trigger an alarm at 80% of the maximum allowed value and the KPIj_load_control may trigger an alarm at 90% of the maximum allowed value for the KPIj, consistent with the SLOs.

The KPIs relevant to that alarm are monitored (STEP 1404). While KPIs remain below threshold, monitoring continues. (STEP 1406). However, if any of the KPIs is exceeded, an alarm is triggered (STEP 1408) (a KPI-j_alarm). The alarm may be provided to any interested entity, such as a network administrator, a system component, a QoS flow, the UE, the RAN, the EPC, or any other entity that for example has an interest in knowing that a particular QoS flow or system component or microslice instance is nearing its maximum allowed value.

If the alarm is designed to a trigger a control procedure, then the control procedure is triggered (STEP 1410). For example, a specific threshold may be set to trigger load control (a KPIj_load_control) procedure, and a specific threshold may be set to trigger an admission control (a KPIj_admission_control) procedure.

(17) Enterprise Network Block Diagram

Figure 15:
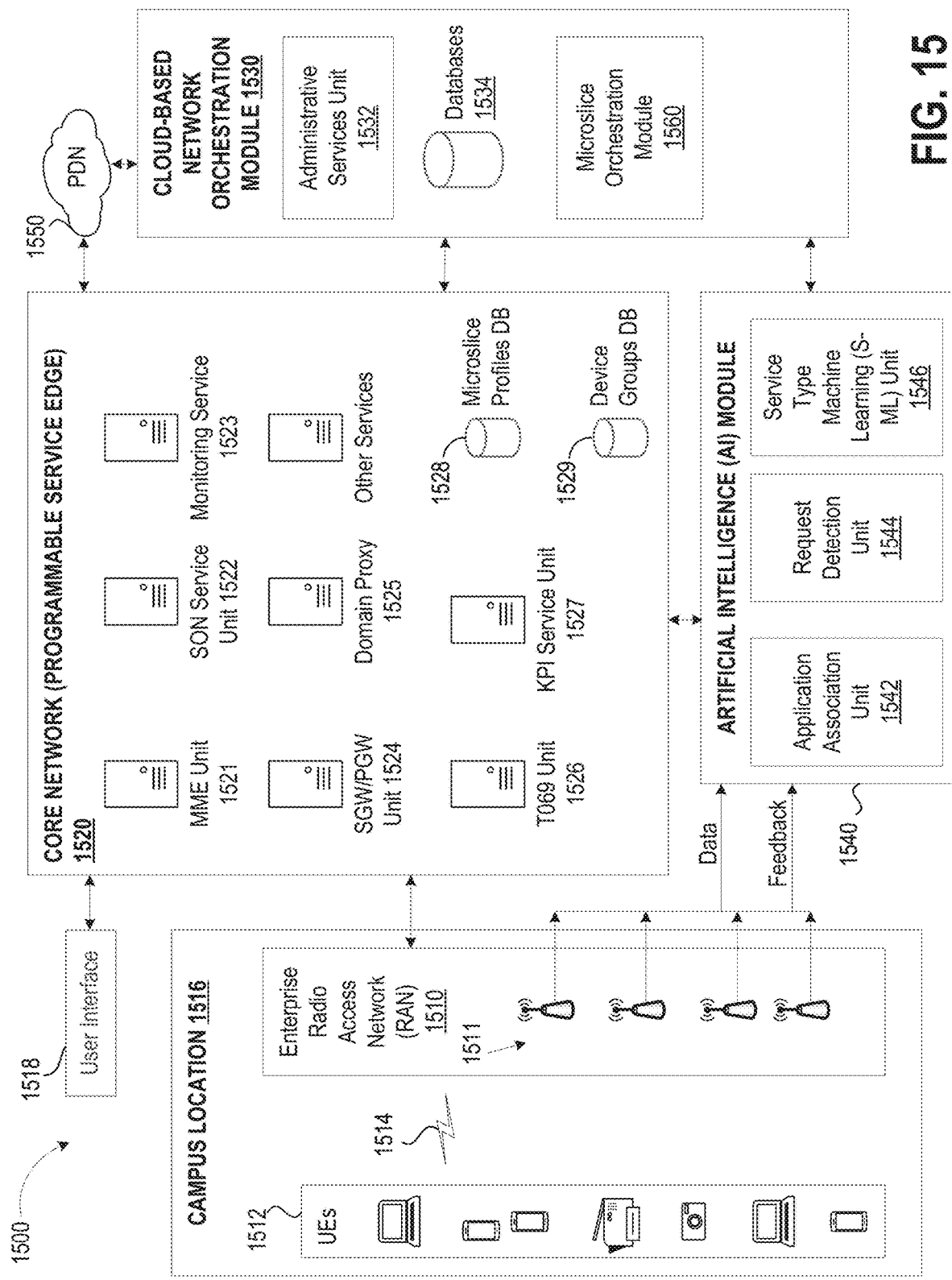
FIG. 15 is a block diagram of an implementation of an enterprise network including a cloud-based orchestration module.

FIG. 15 is a block diagram of an implementation of an enterprise network 1500 that implements the techniques described herein. The enterprise network 1500 includes a radio access network (RAN) 1510 that includes a plurality of BS/APs 1511 that wirelessly communicate with a plurality of UEs 1512 over a wireless link 1514. The BS/APs 1511 are installed in a campus 1516, and the UEs 1512 are present in or around the campus 1516 to wirelessly communicate with one or more of the BS/APs 1511.

In the illustrated embodiment, the enterprise network 1500 includes a core network 1520 (also called a Programmable service edge or "PSE") that provides a variety of services for the network. An administrative interface 1518 allows a network administrator to access the enterprise network. A cloud-based network orchestration module 1530, connected to the core network 1520, provides administrative services 1532, databases 1534, and other functional units that may provide machine learning and artificial intelligence.

The core network 1520 includes a plurality of components that provide services for the network, including an MMF (Mobility Management Function) unit 1521, a SON (Self Organizing Network) service unit 1522, a monitoring service unit 1523, an SGW/PGW (Serving Gateway/Packet Data Network Gateway) unit 1524, a domain proxy 1525, a TR069 unit 1526, and a KPI (Key Performance Indicator) service unit 1527. The core network 1520 may also include microslice profiles database 1528, device groups database 1529, and other units for additional network services as required or useful. In some implementations, the AI module 1540 may be implemented as part of the core network module 1520.

The core network 1520 is connected to a cloud-based network orchestration module 1530. The core network 1520 and the orchestration module 1530 may be connected via a Packet Data Network (PDN) 1550. The cloud-based orchestration components 1530 include an Administrative Service Unit 1532 for remote administration of the enterprise network, databases 1534, a Microslice Orchestration Module 1560 (described in more detail with reference to FIG. 16), and other components as may be necessary or useful. In some implementations, the Microslice Orchestration Module 1560 may be implemented as part of the enterprise network 1500. Also, the AI module 1540 may be implemented as part of the orchestration module 1530 or the enterprise network 1500.

Data collected from the BS/APs 1511 may be supplied to an Artificial Intelligence (AI) Module 1540 that includes an Application Association Unit 1542 and Request Detection Unit 1544. The data supplied to the AI Module 1540 may include UE data, RAN data, and may be indicative of the load being experienced by the BS/APs 1511. Data can be collected in batches and history-based learning and/or ML techniques performed on the batch of data, and then implemented. Alternatively, or after initial learning using batches of data, data can be collected periodically or nearly continuously in real time, and learning and ML can be implemented automatically (e.g., 5-minute intervals) to continually improve the models and thereby continually improve network performance.

The AI module 1540, the Application Association Unit 1542, and the Request Detection Unit 1544 include appropriate circuitry to perform their functions. For example, AI systems in the AI module 1540 may be implemented based upon any or all of heatmaps, the estimated ability to defuse congestion by offloading traffic, and preemptive steps to prevent users from attaching to the enterprise network. For example, the AI systems may be implemented to monitor and anticipate congestion in the enterprise network. The AI module 1540 is connected to the core network 1520, and supplies the results of its learning and other information to the core network 1520 and/or the network orchestration module 1530. The AI Module 1540 may also receive feedback from the BS/APs 1511. Particularly, network performance and congestion may be monitored to provide feedback to the AI system. For example, new performance data can be compared and/or combined with the previous data and new learning can be performed. Also, reinforcement learning techniques can be implemented using the new data and historical data to improve the AI system and thereby improve network performance.

(18) Microslice Instance Block Diagram

FIG. 16 is a block diagram of a wireless communication system, comprising a microslice orchestration module 1560 that includes a receiving unit 1662 for receiving data including resource availability information 1602, and a microslice orchestrating unit 1664. The receiving unit 1662 is connected to receive resource availability information 1602, microslice profiles from the microslice profiles database 1528, and device groups from the device group database 1529. The microslice orchestrating unit 1664 determines a network configuration that defines a microslice instance responsive to the microslice profile, the resource availability information 1602, and in some embodiments, the device groups. Particularly, responsive to these inputs, the network configuration defines the configuration for the microslice using functional blocks and the communication links between the functional blocks. The microslice orchestration module 1560 also includes a configuration control unit 1566 for setting up and controlling the functional blocks and the communication links between the functional blocks responsive to the network configuration, to implement a microslice instance.

A functional block is a computing element that performs any activity required to implement a set of logical operations. The functional block may include a dedicated processing circuit that performs an intended function, or it may be a software-implemented process across circuits that performs the intended function. In the current disclosure, the activity required to implement a set of logical operations is performed for the purpose of facilitating end to end communication (e.g., between a UE and an external server). In the communication context, a functional block may be in the control plane or the user plane. To monitor a functional block, control information is exchanged between the block and the orchestrator; for example, the orchestrator may make a query, and the functional block may respond.

A communication link is a connection between two functional blocks that provides communication between the two functional blocks. The communication link may be implemented in any appropriate connection type, such as wireless or wired, and utilize any suitable protocol. The link and/or protocol may be secure or otherwise. A communication link may be monitored at any point in the link, for example it may be monitored at its entry point and/or its exit point to provide performance data.

FIG. 16 shows two examples of microslice instances, including a first instance 1610 and a second instance 1620. The first instance 1610 shows a simple configuration in which a series of interconnected functional blocks 1612 and links 1614 connect a UE with the microslice orchestration module 1560 in the network orchestration module 1530. The second instance 1620 shows a configuration including a control plane 1630 and a user plane 1640, and there are functional blocks and communication links in both the control plane 1630 and the user plane 1640, all of which are connected to the UE and the microslice orchestration module 1560. It should be clear that within the second microslice instance 1620, there are interconnections between the functional units, the UE and the orchestration module 1530. Particularly the control plane 1630 includes a plurality of interconnected functional blocks 1632 and communication links 1634, and the user plane 1640 includes a plurality of interconnected functional blocks 1642 and communication links 1644. Although only two microslice instances are shown, at any time during operation, there may be many microslices operating, e.g., tens, hundreds or thousands of microslices may be operating at any particular point in time.

In some embodiments the microslice orchestration module 1560 is connected to the enterprise network 1500, the receiving unit 1662 receives the microslice profiles, the resource availability information (and optionally the device groups) from the enterprise network, the microslice orchestrating unit determines a network configuration that defines a microslice instance in the enterprise network, and the configuration control unit 1666 sets up and controls the functional blocks and the communication links in the enterprise network to implement the microslice instance.

The orchestrating unit 1664 includes circuitry to set up and configure functional blocks that may be within an enterprise network (i.e., within the enterprise network's control), or the functional blocks may be outside the enterprise network (i.e., the functional block(s) may be outside the enterprise network's control, e.g., in a non-enterprise communication platform). One example of a non-enterprise communication platform is external network 1680, which includes at least one functional block 1682, and is connected to the network orchestration module 1530 and the enterprise network 1500 via an external PDN 103. The external network 1680 may be a private network, for example. The configuration control unit 1666 is connected to set up and control the functional blocks either inside the enterprise network or outside the enterprise network. For example, one of the functional blocks that may be either inside or outside the enterprise network may be a LAN, a VLAN or a VxLAN. A functional block may comprise an internal or external network or network element that can be controlled directly, or indirectly, and/or its communications can be managed, by the configuration control unit 1666.

The enterprise network 1500, or any other network connected to the microslice orchestration module 1560 may provide resource availability information 1602. Resource availability information may include data or other information relevant to any or all of the available network resources, such as available communication resources, computing resources (e.g., hardware like processors, state machines, dedicated circuitry, virtual machines), available spectrum, and the current extent of loading of the functional units, and other network operational parameters such as the KPIs. The microslice orchestration module 1560 may include a Network Resource Allocation Module 1668 that allocates network resources to the microslice configuration responsive to the resource availability information. The allocated network resources may include communication resources, computing resources (e.g., hardware-like processors, state machines, and dedicated circuitry virtual machines) available spectrum, and the current extent of loading of the functional units and other network operation parameters). These quantities may be measured and supplied to the microslice orchestration module 1560 in any appropriate format, e.g., by KPIs.

The microslice orchestration module 1560 includes a monitoring unit 1670 that is connected to the functional units and communication links to separately monitor the performance of the functional units, the communication links between the functional units, and the end-to-end performance to provide Key Performance Indicators (KPIs) for each.

The microslice orchestration module 1560 further includes a performance managing unit 1672 that can revise the microslice configuration responsive to the KPIs and the microslice profile (e.g., the SLOs in the microslice profile) and dynamically adapts the microslice instance responsive to the revised microslice configuration.

FIG. 17 illustrates microslice instances 1710 and 1720 that extend outside the enterprise network 1500. Particularly, FIG. 17 is a block diagram of a wireless communication system that comprises the enterprise network 1500, the cloud-based network orchestration module 1530, and external networks 1780. In FIG. 17, a first microslice instance 1710 connects one of the UEs 1512 with a first external network 1780*a* via functional blocks and links in the enterprise network 1500 that connect to a functional block 1782*a* in the first external network 1780*a*. A second microslice instance 1720 connects one of the UEs 1512 with a second external network 1780*b* via functional blocks and links in the enterprise network 1500 that connect to a functional block 1782*b* in the second external network 1780*b*.

(19) Programmable Embodiments

Some or all aspects of the invention may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code may be applied to input data to perform the functions described in this disclosure and generate output information. The output information may be applied to one or more output devices in known fashion.

Each such computer program may be implemented in any desired computer language (including machine, assembly, or high-level procedural, logical, or object-oriented programming languages) to communicate with a computer system, and may be implemented in a distributed manner in which different parts of the computation specified by the software are performed by different computers or processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently or permanently), the storage media or device being readable by a general or special purpose programmable computer or processor for configuring and operating the computer or processor when the storage media or device is read by the computer or processor to perform the procedures described above. The inventive system may also be considered to be implemented as a non-transitory computer-readable storage medium, configured with a computer program, where the storage medium so configured causes a computer or processor to operate in a specific or predefined manner to perform the functions described in this disclosure.

(20) Embodiments and Description

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion. Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A microslice orchestration module for implementing a microslice that provides a communication path for a wireless device connected to a network, comprising:
    a receiving unit for receiving device information, microslice profiles and resource availability information, each microslice profile defining parameters of data flow that ensure a specified Quality of Service (QoS) requirement and a specified Service Level Objective (SLO) meeting service requirements of a service type or an application;
    a microslice orchestrating unit for determining a network configuration that defines a microslice instance responsive to the device information, microslice profiles and the resource availability information, the network configuration of the microslice instance defining functional blocks and communication links between the functional blocks; and
    a configuration control unit for setting up and controlling the functional blocks and the communication links between the functional blocks responsive to the network configuration, to implement the microslice instance for the wireless device, the mircoslice instance including a communication link with a wireless User Equipment (UE) that meets service requirements for the wireless UE, and the migroslice provides viitual logical network as an end-to-end connection that is not limited by definitions of Standard Development Organizations (SDOs).

2. The microslice orchestration module of claim 1 wherein:
    the microslice orchestration module is connected to an enterprise network;
    the receiving unit receives the device information, microslice profile and the resource availability information from the enterprise network;
    the microslice orchestrating unit determines a network configuration that defines a microslice instance in the enterprise network; and
    the configuration control unit sets up and controls the functional blocks and the communication links in the enterprise network to implement the microslice instance.

3. The microslice orchestration module of claim 1 wherein the microslice orchestration module includes a Network Resource Allocation Module that allocates network resources to the microslice configuration responsive to resource availability information from the enterprise network.

4. The microslice orchestration module of claim 1 wherein:
    the microslice orchestration module is connected to an enterprise network;
    the network configuration includes a plurality of functional blocks from the enterprise network and at least one functional block from a non-enterprise communication platform.

5. The microslice orchestration module of claim 4 wherein at least one of the functional blocks in the microslice instance is a VLAN.

6. The microslice orchestration module of claim 1 further comprising a monitoring unit connected to at least one functional unit, that separately monitors the performance of the at least one functional unit and the performance of at least one link to provide KPis (Key Performance Indicators).

7. The microslice orchestration module of claim 6 wherein the monitoring unit is connected to each of the function units and each of the links, and separately monitors the performance of each of the functional units and each of the links, to provide KPis.

8. The microslice orchestration module of claim 6 wherein the monitoring unit monitors end-to-end performance.

9. The microslice orchestration module of claim 6 further comprising a performance managing unit that revises—a—microslice configuration responsive to the KPis and the microslice profile and dynamically adapts the microslice instance responsive to the revised microslice configuration.

10. The microslice orchestration module of claim 1 wherein the receiving unit is connected to receive device groups from the enterprise network, and the microslice orchestrating unit defines a microslice instance responsive to the device group and device information.

11. A method for implementing a microslice that provides a communication path for a wireless device connected to an enterprise network, comprising:
    receiving device information, microslice profiles and resource availability information from the enterprise network, each microslice profile defining parameters of data flow that ensure a specified Quality of Service (QOS) requirement and a specified Service Level Objective (SLO) meeting service requirements of a service type or an application;
    responsive to the device information and microslice profiles, selecting a microslice profile, responsive to the selected microslice profile and the resource availability information, determining a network configuration that defines a microslice instance, including defining functional blocks and communication links between the functional blocks in the enterprise network; and
    responsive to the network configuration, setting up and managing the functional blocks and the communication links between the functional blocks, to implement the microslice instance for the wireless device, the mircoslice instance including a communication link with a wireless User Equipment (UE) that meets service requirements for the wireless UE, and the microslice provides a virtual logical network as an end-to-end connection that is not limited by definitions of Standard Development Organizations (SDOs).

12. The method of claim 11 wherein resources are allocated to the microslice configuration in a Network Resource Allocation Module responsive to the resource availability information provided by the enterprise network.

13. The method of claim 11 wherein the step of determining a network configuration defines at least one functional block from a non-enterprise communication platform, so that the microslice instance includes at least one non-enterprise functional block.

14. The method of claim 11 wherein the step of determining a network configuration defines a VLAN for at least one of the functional blocks in the microslice instance.

15. The method of claim 11 further comprising monitoring at least one functional unit and at least one link in the microslice instance, to provide KPis (Key Performance Indicators).

16. The method of claim 15 further comprising monitoring each of the function units and each of the links in the microslice instance.

17. The method of claim 15 further comprising monitoring end-to-end performance of the microslice instance.

18. The method of claim 15 wherein the selected microslice profile includes SLOs (Service Level Objectives), further comprising revising the microslice configuration responsive to the KPis and the SLOs, to provide a revised microslice configuration.

19. The method of claim 18 including dynamically adapting the microslice instance responsive to the revised microslice configuration.

20. The method of claim 11 wherein the device is associated with a device group, a receiving unit is connected to receive device groups from the enterprise network, and the step of selecting a microslice profile is responsive to the device group associated with the device.

* * * * *